(12) United States Patent
Fujisawa et al.

(10) Patent No.: US 6,881,802 B2
(45) Date of Patent: Apr. 19, 2005

(54) CATALYST FOR ADDITION POLYMERIZATION AND PROCESS FOR PRODUCING AN ADDITION POLYMER

(75) Inventors: Kiyoshi Fujisawa, Tsukuba (JP); Masaaki Nabika, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 325 days.

(21) Appl. No.: 10/166,379

(22) Filed: Jun. 11, 2002

(65) Prior Publication Data

US 2003/0032743 A1 Feb. 13, 2003

(30) Foreign Application Priority Data

Jun. 13, 2001 (JP) .......................... 2001-178252
Jun. 13, 2001 (JP) .......................... 2001-178253

(51) Int. Cl.$^7$ ................................. C08F 4/42
(52) U.S. Cl. ................. 526/161; 526/348; 526/352; 526/348.2; 526/151; 502/103; 502/123
(58) Field of Search ................ 526/161, 348, 526/352, 348.6, 151; 502/103, 123

(56) References Cited

U.S. PATENT DOCUMENTS 5,627,164 A    5/1997  Gorun et al.
6,069,110 A    5/2000  Kläui et al.

FOREIGN PATENT DOCUMENTS

EP    0 816 386 A2   1/1998
EP    0 816 386 B1   1/1998
WO    WO 97/17379 A1   5/1997
WO    WO 97/17379    *  5/1997
WO    WO 00/59914 A1  10/2000

OTHER PUBLICATIONS

Trofimenko, J.Am.Chem.Soc., 88(8),1842–1844(1966).*
Chen, J. et al.: Journal of Organometallic Chemistry, vol. 601, No. 1, (2000) pp. (57–68), XP004196093.
Singh, U. P. et al.: Inorganica Chimica Acta, vol. 310 (2), (2000) pp. 273–278, XP002214166.
Burzlaff, N et al.: Journal of Organometallic Chemistry, Elsevier–Sequoia S.A. Lausanne, CH, vol. 626, No. 1–2, (2001) pp. 16–23, XP004235637.
Miller et al., Journal of the American Chemical Society, vol. 88 No. 8, pp. 1842–1844, 1966.
Kitajima et al., Journal of the American Chemical Society, vol. 113, pp7757–7758, 1991.
Ban et al., J. Polym. Sci., Polym. Chem., vol. 39, pp. 3733–3738, 2001.

* cited by examiner

Primary Examiner—Ling-Siu Choi
(74) Attorney, Agent, or Firm—Birch, Stewart, Kolasch & Birch, LLP

(57) ABSTRACT

A catalyst obtained by contacting a specific transition metal compound (A) of Group 7 of the Periodic Table of the Elements, having a pyrazolyl group with an aluminum compound selected from organoaluminums and aluminoxanes and/or a specific boron compound, and a process for producing an addition polymer which comprises polymerizing an addition polymerizable monomer with the catalyst.

12 Claims, 2 Drawing Sheets

CATALYST FOR ADDITION POLYMERIZATION AND PROCESS FOR PRODUCING AN ADDITION POLYMER

BACKGROUND OF THE INVENTION

1. Field of the Invention

The present invention relates to a catalyst for addition polymerization, and a process for producing an addition polymer with the catalyst.

2. Description of the Related Art

In the field of single-site catalysts, there have been already a lot of reports regarding a process for producing an addition polymer such as an olefin polymer using a transition metal compound such as a metallocene complex. For example, JP58019309A reports a process for producing an olefin polymer using a metallocene complex and aluminoxane.

Regarding a process for producing an addition polymer using a transition metal compound called non-metallocene, there have been done wide researches on from the early transition metal to the late transition metal, however, in general, there are a lot of studies regarding combinations of ligands as described above in the range of Groups III to VI metals and Groups VIII to X metals, while there are few research regarding application to a catalyst addition polymerization of Group VII metals.

Oligopyrazole ligands combining a plurality of pyrazoles have very long been studied as a metal ligand, and as a metal complex of Group VII, there is a report of a {bis[hydrotris (pyrazolyl)borate]manganese} complex by S. Trofimenko, et at., J. Am. Chem. Soc., 88, 1842 (1966), and also thereafter, Moro-oka, et al., J. Am. Chem. Soc., 113, 7757 (1991) have progressed studies mainly in the field of biological inorganic chemistry such as findings of the ability of a mono-nuclear oligo(pyrazolyl)borate-manganese complex as an oxygen carrier, and the like, however, there is no study regarding application to a catalytic reaction.

Sangyo Kagaku Gijutsu Kenkyu Kaihatsu (Industrial Scientific Technology Research and Development), third Dokusoteki Koseino Zairyo Sosei Gijutsu Symposium (Original High Performance Material Creation Technology Symposium), preprints, pp. 125 to 126, describes an example of polymerization of ethylene and propylene using $Mn(acac)_3$ and Mn-salen complex. This literature discloses that a catalyst prepared by using the complex shows no polymerization activity on propylene, but that propylene is polymerized by supporting on magnesium it though the activity thereof is extremely low.

Therefore, the above-mentioned Mn compounds have little polymerization activity of addition polymerizable monomers, and further, could not provide a stereoregular α-olefin polymer.

SUMMARY OF THE INVENTION

Under such conditions, an object of the present invention is to provide a catalyst for addition polymerization having high activity, and an efficient producing process of an addition polymer with the catalyst.

Another object of the present invention is to provide a producing process of a stereoregular α-olefin polymer with the catalyst.

Other objects and advantages of the present invention will be apparent from the following description.

Namely, the present invention relates to a catalyst for addition polymerization obtained by a process comprising contacting a transition metal compound(A) represented by the following general formula [1] or [2] with an aluminum compound(B) described below and/or a boron compound(C) described below:

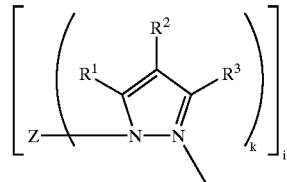

[1]

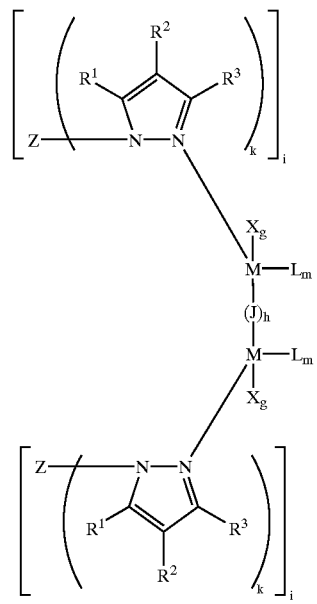

[2]

(in the general formulae [1] and [2], M represents a transition metal atom of Group 7; Xs represent each independently a hydrogen atom, halogen atom, alkyl group, aralkyl group, substituted silyl group, alkoxy group, aralkyloxy group, aryloxy group, acyloxy group, acyl group, di-substituted amino group, substituted pyrazolyl group, isocyanate group, thiocyanate group, nitrosyl group, azide group, cyano group, hydroxyl group, perhalide ion, nitrate ion, hexa-halogenated phosphorus ion or tetra-substituted boron ion; L represents a neutral ligand connected with M via a lone pair or π electron; n represents an integer of 0 to 7 so selected that the compound is neutral; g represents an integer of 0 to 6 so selected that the compound is neutral; m represents and integer of 0 to 5; $R^1$ to $R^3$ represent each independently a hydrogen atom, halogen atom, alkyl group, aralkyl group, aryl group or substituted silyl group and all of $R^1$ to $R^3$ may be the same or different; Z represents a group of $R^4_{z+1}\text{-}Z^1\text{-}$, $R^4_z\text{-}Z^2\text{-}$ or

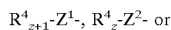
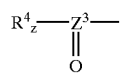

(wherein, $Z^1$ represents an atom of Groups 13 to 15; $Z^2$ represents an atom of Groups 13 to 15 and $Z^3$ represents an atom of Group 15; $R^4$ in each case represents a hydrogen atom, halogen atom, alkyl group, aralkyl group, substituted silyl group, alkoxy group, aralkyloxy group, aryloxy group, di-substituted amino group or substituted pyrazolyl group.); k represents an integer of 1 to 3 and the sum of k and z is 3; J in the general formula [2] is a bridging group connecting two Ms; and h represents an integer of 1 to 3 showing the number of bridging connecting two M's.), (B): one or more aluminum compounds selected from the following (B1) to (B3),
(B1): organoaluminum compounds of the general formula $E^1_a AlZ_{3-a}$,
(B2): cyclic aluminoxanes having a structure of the general formula $\{-Al(E^2)-O-\}_b$,
(B3): linear aluminoxanes having a structure of the general formula $E^3\{-Al(E^3)-O-\}_c AlE^3_2$,
(wherein, each of $E^1$, $E^2$ and $E^3$ represents a hydrocarbon group, and all of $E^1$s, all of $E^2$s and all of $E^3$s maybe the same or different. Z represents a hydrogen atom or halogen atom, all of Zs may be the same or different. a represents a number satisfying $0<a\leq 3$, b represents an integer of 2 or more, and c represents an integer of 1 or more.), and (C): one or more boron compounds selected from the following (C1) to (C3),
(C1): boron compounds of the general formula $BQ^1Q^2Q^3$,
(C2): boron compounds of the general formula $G^+(BQ^1Q^2Q^3Q^4)^-$,
(C3): boron compounds of the general formula $(L-H)^+(BQ^1Q^2Q^3Q^4)^-$,
(wherein, B represents a boron atom of tri-valent state, $Q^1$ to $Q^4$ represent a halogen atom, hydrocarbon group, halogenated hydrocarbon group, substituted silyl group, alkoxy group or di-substituted amino group, and they may be the same or different. $G^+$ represents an inorganic or organic cation, L represents a neutral Lewis base, and $(L-H)^+$ represents a Brønsted acid.).

Further, the present invention relates to a process for producing an addition polymer, which comprises polymerizing an addition polymerizable monomer with said catalyst.

The present invention will be described further in detail below.

Figure 1:
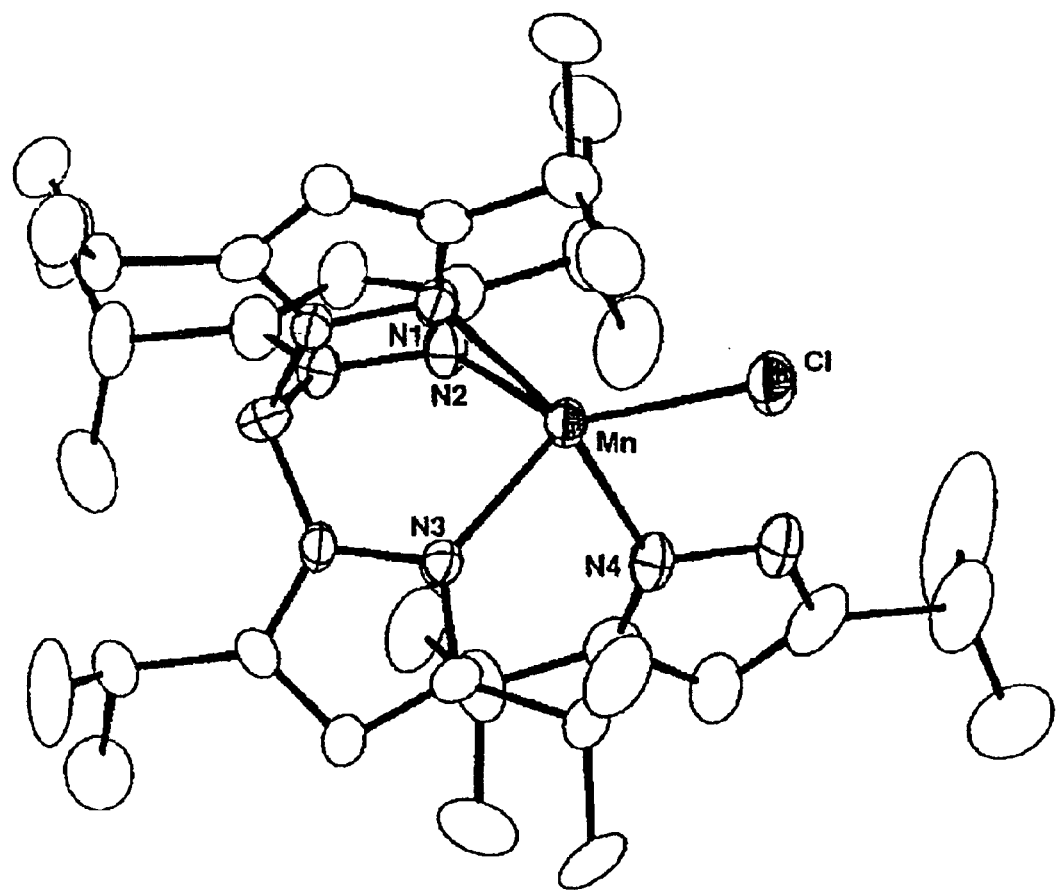
FIG. 1 shows a result of X-ray structure analysis of a single crystal of the compound obtained in Reference Example 1.

DETAILED DESCRIPTION OF THE INVENTION (A) Transition Metal Compound

M in a transition metal compound of the above-mentioned general formula [1] or [2] represents a transition metal atom of Group 7 of the Periodic Table of Elements (IUPAC Inorganic Chemistry Nomenclature, revision 1989), and preferably a manganese atom, technetium atom or rhenium atom, particularly preferably a manganese atom.

X's in the above-mentioned general formula [1] or [2] represent each independently ahydrogen atom, halogen atom, alkyl group, aralkyl group, substituted silyl group, alkoxy group, aralkyloxy group, aryloxy group, acyloxy group, acyl group, di-substituted amino group, substituted pyrazolyl group, isocyanate group, thiocyanate group, nitrosyl group, azide group, cyano group, hydroxyl group, perhalide ion, nitrate ion, hexa-halogenated phosphorus ion or tetra-substituted boron ion, and all of X's may be the same or different.

The halogen atom as X includes a fluorine atom, chlorine atom, bromine atom and iodine atom are listed, and a chlorine atom is preferable.

The alkyl group as X preferably includes alkyl groups having 1 to 20 carbon atoms, and examples thereof include a methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadeyl group, n-eicosyl group, cyclopentyl group, cyclohexyl group, adamantly group and the like, more preferably, a methyl group, ethyl group, isopropyl group, tert-butyl group, cyclohexyl group and adamantly group.

Any of these alkyl groups may be substituted with a halogen atom such as a fluorine atom, chlorine atom, bromine atom, iodine atom or the like. Examples of the alkyl group having 1 to 20 carbon atoms substituted with a halogen atom include a fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctuyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, perbromocyclopentyl group, perbromocyclohexyl group, perbromoadamantyl group and the like.

Any of these alkyl groups may be partially substituted with an alkoxy group such as a methoxy group, ethoxy group or the like, an aryloxy group such as a phenoxy group or the like, or an aralkyloxy group such as a benzyloxy group or the like.

The aralkyl group as X preferably includes aralkyl groups having 7 to 20 carbon atoms, and examples thereof include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-tetradecylphenyl) methyl group, naphthylmethyl group, anthracenylmethyl group and the like, and preferable is a benzyl group.

Any of these aralkyl groups may be partially substituted with ahalogen atom such as afluorine atom, chlorine atom, bromine atom, iodine atom or the like, an alkoxy group such as a methoxy group, ethoxy group or the like, an aryloxy group such as a phenoxy group or the like, or an aralkyloxy group such as a benzyloxy group and or like.

The aryl group as X preferably includes aryl groups having 6 to 20 carbon atoms, and examples thereof include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group and the like, and preferable is a phenyl group.

Any of these aryl groups may be partially substituted with a halogen atom such as a fluorine atom, chlorine atom, bromine atom, iodine atom or the like, an alkoxy group such as a methoxy group, ethoxy group or the like, an aryloxy group such as a phenoxy group or the like, or an aralkyloxy group such as a benzyloxy group or the like.

The substituted silyl group as X includes a silyl group substituted with a hydrocarbon group, and examples of the hydrocarbon group include alkyl groups having 1 to 10 carbon atoms such as a methyl group, ethyl group, n-propyl group, isopropyl group, n-butyl group, sec-butyl group, tert-butyl group, isobutyl group, n-pentyl group, n-hexyl group, cyclohexyl group and the like, aryl groups such as a phenyl group and the like, and other groups.

Examples of the substituted silyl group having 1 to 20 carbon atoms include mono-substituted silyl groups having 1 to 20 carbon atoms such as a methylsilyl group, ethylsilyl group, phenylsilyl group and the like, di-substituted silyl groups having 2 to 20 carbon atoms such as a dimethylsilyl group, diethylsilyl group, diphenylsilyl group and the like, tri-substituted silyl groups having 3 to 20 carbon atoms such as a trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group and the like, etc., and preferable is a trimethylsilyl group, tert-butyldimethylsilyl group or triphenylsilyl group.

Any of these silyl groups may be partially substituted with ahalogen atom such as a fluorine atom, chlorine atom, bromine atom, iodine atom or the like, an alkoxy group such as a methoxy group, ethoxy group or the like, an aryloxy group such as a phenoxy group or the like, or an aralkyloxy group such as a benzyloxy group or the like.

Examples of the alkoxy group as X include a methoxy group, ethoxy group, n-propoxy group, isopropoxy group, n-butoxy group, sec-butoxy group, t-butoxy group, n-pentoxy group, neopentoxy group, n-hexoxy group, n-octoxy group, n-dodesocy group, n-pentadesoxy group, n-icosoxy group and the like, and preferable are methoxy group, ethoxy group and t-butoxy group.

Any of these alkoxy groups may be partially substituted with a halogen atom such as a fluorine atom, chlorine atom, bromine atom, iodine atom or the like, an alkoxy group such as a methoxy group, ethoxy group or the like, an aryloxy group such as a phenoxy group or the like, or an aralkyloxy group and or like.

Examples of the aralkyloxy group as X include a benzyloxy group, (2-methyphenyl)methoxy group, (3-methyphenyl)methoxy group, (4-methyphenyl)methoxy group, (2,3-dimethylphenyl)methoxy group, (2,4-dimethylphenyl)methoxy group, (2,5-dimethylphenyl) methoxy group, (2,6-dimethylphenyl)methoxy group, (3,4-dimethylphenyl)methoxy group, (3,5-dimethylphenyl) methoxy group, (2,3,4-trimethylphenyl)methoxy group, (2,3,5-trimethylphenyl)methoxy group, (2,3,6-trimethylphenyl)methoxy group, (2,4,5-trimethylphenyl) methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethyrphenyl) methoxygroup, (ethylphenyl)methoxyl group, (n-propylphenyl)methoxyl group, (isopropylphenyl) methoxy group, (n-butylphenyl)methoxygroup, (sec-butylphenyl)methoxy group, (tert-butylphenyl) methoxygroup, (n-hexyphenyl)methoxy group, (n-octylphenyl)methoxy group, (n-decylphenyl)methoxy group, (n-tetradecylphenyl)methoxy group, naphthylmethoxy group, anthracenylmethoxy group and the like, and preferable is a benzyloxy group.

Any of these aralkyloxy groups may be partially substituted with a halogen atom such as a fluorine atom, chlorine atom, bromine atom, iodine atom or the like, an alkoxy group such as a methoxy group, ethoxy group or the like, an aryloxy group such as a phenoxy group or the like, or an aralkyloxy group or the like.

Examples of the aryloxy group as X include aryloxy groups having 6 to 20 carbon atoms such as a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecyl phenoxy group, naphthoxy group, anthracenoxy group and the like, etc.

Any of these aryloxy groups may be partially substituted with ahalogen atom such as a fluorine atom, chlorine atom, bromine atom, iodine atom or the like, an alkoxy group such as a methoxy group, ethoxy group or the like, an aryloxy group such as a phenoxy group or the like, or an aralkyloxy group or the like.

Examples of the acyloxy group as X include an acetoxy group, ethylcarbonyloxy group, n-propylcarbonyloxy group, isopropylcarbonyloxy group, n-butylcarbonyloxy group, sec-butylcarbonyloxyl group, isobutylcarbonyloxy group, tert-butylcarbonyloxy group, trifluoroacetoxy group, benzoyloxy group and the like.

Examples of the acyl group as X include a formyl group, acetyl group, propionyl group, butylyl group, isobutylyl group, valeryl group, isovaleryl group, cyclohexanecarbonyl group, benzoyl group and the like.

The di-substituted amino group as X is an amino group substituted with two hydrocarbon groups, and examples of the hydrocarbon group here include alkyl groups having 1 to 10 carbon atoms such as a methyl group, ethyl group, n-propyl group, isopropyl group, n-butyl group. sec-butyl group, tert-butyl group, isobutyl group, n-pentyl group, n-hexyl group, cyclohexyl group and the like, aryl groups such as a phenyl group and the like, and other groups. Examples of the di-substituted amino group having 1 to 10 carbon atoms include a dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group and the like, and preferable are a dimethylamino group and diethylamino group.

Examples of the substituted pyrazolyl group as X include a pyrazolyl group, 3-methylpyrazolyl group, 4-methylpyrazolyl group, 3-ethylpyrazolyl group, 3-n-propylpyrazolyl group, 3-isopropylpyrazolyl group, 3-n-butylpyrazolyl group, 3-sec-butylpyrazolyl group, 3-isobutylpyrazolyl group, 3-tert-butylpyrazolyl group, 3-phenylpyrazolyl group, 3-p-tolylpyrazolyl group, 3-cumylpyrazolyl group, 3-(trifluoromethyl)pyrazolyl group, 3-(pentafluoroethyl)pyrazolyl group, 3-cyclohexylpyrazolyl group, 3-adamantylpyrazolyl group, 4-chloropyrazolyl group, 4-bromopyrazolyl group, 4-iodopyrazolyl group, 3,5-dimethylpyrazolyl group, 3,5-diethylpyrazolyl group, 3,5-di-n-propylpyrazolyl group, 3,5-diisopropylpyrazolyl group, 3,5-di-n-butylpyrazolyl group, 3,5-di-sec-butylpyrazolyl group, 3,5-diisobutylpyrazolyl group, 3,5-di-tert-butylpyrazolyl group, 3,5-diphenylpyrazolyl group, 5-methyl-3-isopropylpyrazolyl group, 3-tert-butyl-5-methylpyrazolyl group, 5-methyl-3-phenylpyrazolyl group, 5-methyl-3-p-tolylpyrazolyl group, 3-cumyl-5-methylpyrazolyl group, 3-adamantyl-5-methylpyrazolyl group, imidazolyl group, 7-methylimidazolyl group, 7-isopropylimidazolyl group, 7-tert-butylimidazolyl group and the like.

Further, the group as X includes an isocyanate group, thioisocyanate group, nitrosyl group, azide group, cyano group, and hydroxyl group.

X may also be a free anion, and the above-mentioned halogen atom, acyloxy group and hydroxyl group may exist as corresponding anions, respectively. For example, $F^-$, $Cl^-$, $Br^-$, $I^-$, acetate ion, propionate ion, n-butylonate ion, isobutylonate ion, n-pentylonate ion, sec-pentylonate ion, isopentylonate ion, tert-pentylonate ion, trifluoroacetate ion, benzoate ion, $OH^-$ and the like are mentioned. Additionally, as the free anion, a perhalide ion, nitrate ion, hexa-halogenated phosphorus ion and tetra-substituted boron ion are listed. As the per-halide ion, for example, $ClO_4^-$ is mentioned. As the hexa-halogenated phosphorus ion, for example, $PF_6^-$ is mentioned. As the tetra-substituted boron ion, for example, $BPh_4^-$ and $BF_4^-$ are listed.

X's in the above-mentioned general formula [1] or [2] represent each independently a halogen atom, alkyl group, aralkyl group, alkoxy group. aralkyloxy group, hydroxyl group, perhalide ion, nitrate ion, hexa-halogenated phosphorus ion or tetra-substituted boron ion, further preferably, each independently a halogen atom, alkyl group, alkoxy group, aralkyloxy group, nitrate ion, hexa-halogenated phosphorus ion or tetra-substituted boron ion, particularly preferably, each independently a halogen atom, alkyl group, nitrate ion or tetra-substituted boron ion.

In the above-mentioned general formulae [1] and [2], n and g are the number of X's and represent an integer of 0 to 7 and 0 to 6, respectively, so selected that the compound is neutral.

In the above-mentioned general formulae [1] and [2], L represents a neutral ligand connected with M via a lone pair or $\pi$ electron.

The neutral ligand connected with M via a lone pair is a neutral ligand connected with M via a coordinate bond, and examples thereof include ethers such as diethyl ether, tetrahydrofuran and dimethoxyethane, amines such as triethylamine, N,N,N',N'-tetramethylethylenediamine, pyridines such as pyridine, 2,6-dimethylpyridine and quinoline, pyrazole, substituted pyrazoles such as 3-methylpyrazole, 4-methylpyrazole, 5-methylpyrazole, 3-ethylpyrazole, 3-n-propylpyrazole, 3-isopropylpyrazole, 3-n-butylpyrazole, 3-sec-butylpyrazole, 3-isobutylpyrazole, 3-tert-butylpyrazole, 3-phenylpyrazole, 3-p-tolylpyrazole, 3-cumylpyrazole, 3-(trifluoromethyl)pyrazole, 3-(pentafluoroethyl)pyrazole, 3-cyclohexylpyrazole, 3-adamantylpyrazole, 4-chloropyrazole, 4-bromopyrazole, 4-iodopyrazole, 3,5-dimethylpyrazole, 3,5-diethylpyrazole, 3,5-di-n-propylpyrazole, 3,5-diisopropylpyrazole, 3,5-di-n-butylpyrazole, 3,5-di-sec-butylpyrazole, 3,5-diisobutylpyrazole, 3,5-di-tert-butylpyrazole, 3,5-diphenylpyrazole, 5-methyl-3-isopropylpyraozole, 3-tert-butyl-5-methylpyrazole, 5-methyl-3-phenylpyrazole, 5-methyl-3-p-tolylpyrazole, 3-cumyl-5-methylpyrazole, 3-adamantyl-5-methylpyrazole, imidazole, 7-methylimidazole, 7-isopropylimidazole and 7-tert-butylimidazole, phosphines such as trimethylphosphine, triethylphosphine, triphenylphoshpine, dimethylphenylphosphine, methyldiphenylphosphine, 1,2-bis(dimethylphosphino)ethane, 1,2-bis(diethylphosphino)ethane, 1,2-bis(diphenylphosphino)ethane and 1,3-bis(diphenylphosphino)propane, nitriles such as acetonitrile and benzonitrile, or endo-on type nitrogen molecule and carbon monoxide, and preferable are tetrahydrofuran, N,N,N',N'-tetramethylethylenediamine, pyridine, dimethylphenylphosphine, 1,2-bis(dimethylphosphino)ethane, 1,2-bis(diethylphosphino)ethane, 1,2-bis(diphenylphosphino)ethane, 1,3-bis(diphenylphosphino)propane, acetonitrile and carbon monoxide.

The neutral ligand connected with M via a $\pi$ electron is a neutral ligand connected with M via a multiple bonding orbital, and examples thereof include olefins such as ethylene, propylene and the like, dienes such as butadiene, 2,4-hexadiene and 1,4-diphenylbutadiene, ketones such as acetone and benzophenone, side-on type nitrogen molecule, and the like, and preferable are olefins and dienes, more preferable are ethylene, butadiene, 2,4-hexadiene and 1,4-diphenylbutadiene.

In the above-mentioned general formulae [1] and [2], m represents the number of neutral ligands L and is an integer of 0 to 5. m is preferably 0 to 3, further preferably 0 or 1.

In the above-mentioned general formulae [1] and [2], $R^1$, $R^2$ and $R^3$ represent a hydrogen atom, halogen atom, alkyl group, aralkyl group, aryl group or substituted silyl group, and all of $R^1$, $R^2$ and $R^3$ may be the same or different. The halogen atom, alkyl group, aralkyl group, aryl group and substituted silyl group herein referred to are the same as described already as X. In the above-mentioned general formulae [1] and [2], $R^1$, $R^2$ and $R^3$ represent preferably, each independently a hydrogen atom, fluorine atom, chlorine atom, bromine atom, methyl group, ethyl group, isopropyl group, tert-butyl group, cyclohexyl group, adamantly group, benzyl group, phenyl group or 4-tolyl group, further preferably, each independently a hydrogen atom, fluorine atom, chlorine atom, methyl group, isopropyl group, tert-butyl group, cyclohexyl group, adamantly group or phenyl group, particularly preferably, each independently a hydrogen atom, chlorine atom, methyl group, isopropyl group, tert-butyl group or adamantly group.

In the above-mentioned general formulae [1] and [2], Z represents a group of

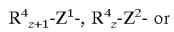

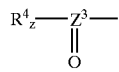

(wherein, $Z^1$ represents an atom of Groups 13 to 15 of the Periodic Table of the Elements, $Z^2$ represents an atom of Groups 13 to 15 of the Periodic Table of the Elements, and $Z^3$ represents an atom of Group 15 of the Periodic Table of the Elements. $R^4$ in each case represents a hydrogen tom, halogen atom, alkyl group, aralkyl group, substituted silyl group, alkoxy group, aralkyloxy group, aryloxy group, di-substituted amino group or substituted pyrazolyl group.);

Here, the atom of Group 13 includes a boron atom, aluminum atom and the like, the atom of Group 14 includes a carbon atom, silicon atom and the like, and the atom of the Group 15 includes a nitrogen atom, phosphorus atom and the like. $Z^1$ represents preferably an atom of the Group 13 or 14, further preferably a boron atom or carbon atom. $Z^2$ represents preferably a boron atom or phosphorus atom, further preferably a phosphorus atom. $z^3$ represents preferably a nitrogen atom or phosphorus atom, further preferably a phosphorus atom.

The halogen atom, alkyl group, aralkyl group, substituted silyl group, di-substituted amino group and substituted pyrazolyl group represented by $R^4$ are the same as described already as X. The above-mentioned $R^4$ represents preferably a hydrogen atom, halogen atom, alkyl group, aralkyl group, substituted silyl group, alkoxy group, aralkyloxy group, aryloxy group or substituted pyrazolyl group, further preferably a hydrogen atom, halogen atom, alkyl group, aralkyl group, substituted silyl group, di-substituted amino group or substituted pyrazolyl group, particularly preferably a hydrogen atom, alkyl group, aralkyl group or substituted pyrazolyl group.

In the above-mentioned general formula [1] or [2], k represents an integer of 1 to 3, and the sum of k and z is 3. k represents preferably 2 or 3, further preferably 3.

In the above-mentioned general formula [1] or [2], Z represents preferably a group of

and among them, groups of

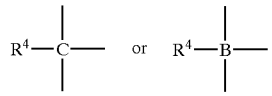

are preferable, and k in these cases is 3 and $R^4$ represents particularly preferably a hydrogen atom, alkyl group, aralkyl group or substituted pyrazolyl group.

In the above-mentioned general formula [2], J is a bridging group connecting two M's. Examples of the bridging group herein referred to include a hydroxyl group, oxygen atom, molecular oxygen molecule, peroxo group, molecular nitrogen molecule, azide, disulfide, carbon monoxide, alkoxy group, aralkyloxy group, aryloxy group, acyl group, acyloxy group and the like. Bonding forms with these M's exemplified for understanding are as follows:

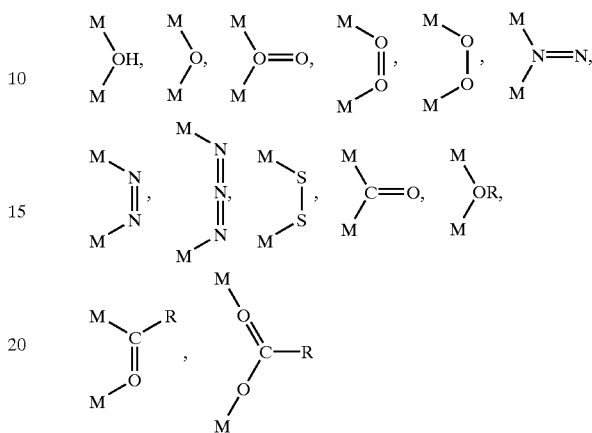

(wherein, R represents an alkyl group, aralkyl group or aryl group.) and the like. J represents preferably a hydroxyl group, oxygen atom, molecular oxygen molecule, peroxo group, alkoxy group, aryloxy group, acyloxy group, azide group or carbon monoxide, further preferably a hydroxyl group, oxygen atom, peroxo group, alkoxy group, aryloxy group or acyloxo group.

In the above-mentioned general formula [2], h is a number representing the number of cross-linking connecting two Ms, and represents an integer of 1 to 3. The cross-linking group Q is a hydroxyl group, and examples of bonding forms when h is 2 include the following form.

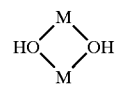

In the above-mentioned general formula [1], it is preferable that k×i+m+n≦6, and in the general formula [2], it is preferable that g+h+k×i+m≦6.

Specific examples of the compound of the above-mentioned general formula [1] include chloro[hydrotris(1-pyrazolyl)borate]manganese, chloro[hydrotris(3-methyl-1-pyrazolyl)borate]manganese, chloro[hydrotris(4-methyl-1-pyrazolyl)borate]manganese, chloro[hydrotris(3-ethyl-1-pyrazolyl)borate]manganese, chloro[hydrotris(3-n-propyl-1-pyrazolyl)borate]manganese, chloro[hydrotris(3-isopropyl-1-pyrazolyl)borate]manganese, chloro[hydrotris(3-n-butyl-1-pyrazolyl)borate]manganese, chloro[hydrotris(3-sec-butyl-1-pyrazolyl)borate]manganese, chloro[hydrotris(3-isobutyl-1-pyrazolyl)borate]manganese, chloro[hydrotris(3-tert-butyl-1-pyrazolyl)borate]manganese, chloro[hydrotris(3-phenyl-1-pyrazolyl)borate]manganese, chloro[hydrotris(3-p-tolyl-1-pyrazolyl)borate]manganese, chloro[hydrotris(3-cumyl-1-pyrazolyl)borate]manganese, chloro{hydrotris[3-(trifluoromethyl)-1-pyrazolyl]borate}manganese, chloro{hydrotris[3-(pentafluoroethyl)-1-pyrazolyl]borate}manganese, chloro[hydrotris(3-cyclohexyl-1-pyrazolyl)borate]manganese, chloro[hydrotris(3-adamantyl-1-pyrazolyl)borate]manganese, chloro[hydrotris(4-chloro-1-pyrazolyl)borate]manganese, chloro[hydrotris(4-bromo-1-pyrazolyl)borate]manganese, chloro[hydrotris(4-iodo-1-pyrazolyl)borate]manganese, chloro[hydrotris(3,5-dimethyl-1-pyrazolyl)borate]manganese, chloro[hydrotris(3,5-diethyl-1-pyrazolyl)borate]manganese, chloro[hydrotris(3,5-di-n-propyl-1-pyrazolyl)borate]manganese, chloro[hydrotris(3,5-diisopropyl-1-pyrazolyl)borate]manganese, chloro[hydrotris(3,5-di-n-butyl-1-pyrazolyl)borate]manganese, chloro[hydrotris(3,5-di-sec-butyl-1-pyrazolyl)borate]manganese, chloro[hydrotris(3,5-diisobutyl-1-pyrazolyl)borate]manganese, chloro[hydrotris(3,5-di-tert-butyl-1-pyrazolyl)borate]manganese, chloro[hydrotris(3,5-diphenyl-1-pyrazolyl)borate]manganese, chloro[hydrotris(5-methyl-3-isopropyl-1-pyrazolyl)borate]manganese, chloro[hydrotris(3-tert-butyl-5-methyl-1-pyrazolyl)borate]manganese, chloro[hydrotris(5-methyl-3-phenyl-1-pyrazolyl)borate]manganese, chloro[hydrotris(5-methyl-3-p-tolyl-1-pyrazolyl)borate]manganese, chloro[hydrotris(3-cumyl-5-methyl-1-pyrazolyl)borate]manganese, chloro[hydrotris(3-adamantyl-5-methyl-1-pyrazolyl)borate]maganese, chloro[hydrotris(1-imidazolyl)borate]manganese, chloro[hydrotris(7-methyl-1-imidazolyl)borate]manganese, chloro[hydrotris(7-isopropyl-1-imidazolyl)borate]manganese, chloro[hydrotris(7-tert-butyl-1-imidazolyl)borate]manganese and the like, and transition metal compounds such as compounds in which manganese in these compounds is changed to technetium or rhenium, compounds in which chlorine in these compounds is changed to fluorine, bromine, iodoine, methyl, benzyl, methoxy or phenoxy, compounds in which hydrogen in these compounds is changed to methyl, ethyl, n-propyl, isopropyl, n-butyl, sec-butyl, isobutyl, tert-butyl, phenyl, p-tolyl, cumyl, pyrazolyl, 3-methylpyrazolyl, 4-methylpyrazolyl, 3-ethylpyrazolyl, 3-n-propylpyrazolyl, 3-isopropylpyrazolyl, 3-n-butylpyrazolyl, 3-sec-butylpyrazolyl, 3-isobutylpyrazolyl, 3-tert-butylpyrazolyl, 3-phenylpyrazolyl, 3-p-tolylpyrazolyl, 3-cumylpyrazolyl, 3-(trifluoromethyl)pyrazolyl, 3-(pentafluoroethyl)pyrazolyl, 3-cyclohexylpyrazolyl, 3-adamantylpyrazolyl, 4-chloropyrazolyl, 4-bromopyrazolyl, 4-iodopyrazolyl, 3,5-dimethylpyrazolyl, 3,5-diethylpyrazolyl, 3,5-di-n-propylpyrazolyl, 3,5-diisopropylpyrazolyl, 3,5-di-n-butylpyrazolyl, 3,5-di-sec-butylpyrazolyl, 3,5-diisobutylpyrazolyl, 3,5-di-tert-butylpyrazolyl, 3,5-diphenylpyrazolyl, 5-methyl-3-isopropylpyrazolyl, 3-tert-butyl-5-methylpyrazolyl, 5-methyl-3-phenylpyrazolyl, 5-methyl-3-para-tolylpyrazolyl, 3-cumyl-5-methylpyrazolyl, 3-adamantyl-5-methylpyrazolyl, imidazolyl, 7-methylimidazolyl, 7-isopropylimidazolyl or 7-tert-butylimidazolyl, and compounds in which borate in these compounds is changed to aluminate.

Specific examples of the compound of the above-mentioned general formula [1] include also chloro[dihydrobis(1-pyrazolyl)borate]manganese, chloro[dihydrobis(3-methyl-1-pyrazolyl)borate]manganese, chloro[dihydrobis(4-methyl-1-pyrazolyl)borate]manganese, chloro[dihydrobis(3-ethyl-1-pyrazolyl)borate]manganese, chloro[dihydrobis(3-n-propyl-1-pyrazolyl)borate]manganese, chloro[dihydrobis(3-isopropyl-1-pyrazolyl)borate]manganese, chloro[dihydrobis(3-n-butyl-1-pyrazolyl)borate]manganese, chloro[dihydrobis(3-sec-butyl-1-pyrazolyl)borate]manganese, chloro[dihydrobis(3-isobutyl-1-pyrazolyl)borate]manganese, chloro[dihydrobis(3-tert-butyl-1-pyrazolyl)borate]manganese, chloro[v(3-phenyl-1-pyrazolyl)borate]manganese, chloro[dihydrobis(3-p-tolyl-1pyrazolyl)borate]manganese, chloro[dihydrobis(3-cumyl-1-pyrazolyl)borate]manganese, chloro{dihydrobis [3-(trifluoromethyl)-1-pyrazolyl] borate}manganese, chloro{dihydrobis[3-(pentafluoroethyl)-1-pyrazolyl]borate}manganese, chloro[dihydrobis(3-cyclohexyl-1-pyrazolyl)borate]manganese, chloro[dihydrobis (3-adamantyl-1-pyrazolyl)borate]manganese, chloro[dihydrobis(4-chloro-1-pyrazolyl)borate]manganese, chloro[dihydrobis(4-bromo-1-pyrazolyl)borate]manganese, chloro[dihydrobis(4-iodo-1-pyrazolyl)borate]manganese, chloro[dihydrobis(3,5-dimethyl-1-pyrazolyl)borate]manganese, chloro[dihydrobis(3,5-diethyl-1-pyrazolyl)borate]manganese, chloro[dihydrobis(3,5-di-n-propyl-1-pyrazolyl)borate]manganese, chloro[dihydrobis(3,5-diisopropyl-1-pyrazolyl)borate]manganese, chloro[dihydrobis(3,5-di-n-butyl-1-pyrazolyl)borate]manganese, chloro[dihydrobis(3,5-di-sec-butyl-1-pyrazolyl)borate]manganese, chloro[dihydrobis(3,5-diisobutyl-1-pyrazolyl)borate]manganese, chloro[dihydrobis(3,5-di-tert-butyl-1-pyrazolyl)borate]manganese, chloro[dihydrobis(3,5-diphenyl-1-pyrazolyl)borate]manganese, chloro[dihydrobis(5-methyl-3-isopropyl-1-pyrazolyl)borate]manganese, chloro[dihydrobis(3-tert-butyl-5-methyl-1-pyrazolyl)borate]manganese, chloro[dihydrobis(5-methyl-3-phenyl-1-pyrazolyl)borate]manganese, chloro[dihydrobis(5-methyl-3-p-tolyl-1-pyrazolyl)borate]manganese, chloro[dihydrobis(3-cumyl-5-methyl-1-pyrazolyl)borate]manganese, chloro[dihydrobis(3-adamantyl-5-methyl-1-pyrazolyl)borate]manganese, chloro[dihydrobis(1-imidazolyl)borate]manganese, chloro[dihydrobis(7-methyl-1-imidazolyl)borate]manganese, chloro[dihydrobis(7-isopropyl-1-imidazolyl)borate]manganese, chloro[dihydrobis(7-tert-butyl-1-imidazolyl)borate]manganese and the like, and transition metal compounds such as compounds in which manganese in these compounds is changed to technetium or rhenium, compounds in which chloro in these compounds is changed to fluoro, bromo, iodo, methyl, benzyl, methoxy or phenoxy, compounds in which hydrogen in these compounds is changed to methyl, ethyl, n-propyl, isopropyl, n-butyl, sec-butyl, isobutyl, tert-butyl, phenyl, p-tolyl, or cumyl, and compounds in which borate in these compounds is changed to aluminate.

Specific examples of the compound of the above-mentioned general formula [1] further include dichloro[tris(1-pyrazolyl)methane]manganese, dichloro[tris(3-methyl-1-pyrazolyl)methane]manganese, dichloro[tris(4-methyl-1-pyrazolyl)methane]manganese, dichloro[tris(3-ethyl-1-pyrazolyl)methane]manganese, dichloro[tris(3-n-propyl-1-pyrazolyl)methane]manganese, dichloro[tris(3-isopropyl-1-pyrazolyl)methane]manganese, dichloro[tris(3-n-butyl-1-pyrazolyl)methane]manganese, dichloro[tris(3-sec-butyl-1-pyrazolyl)methane]manganese, dichloro[tris(3-isobutyl-1-pyrazolyl)methane]manganese, dichloro[tris(3-tert-butyl-1-pyrazolyl)methane]manganese, dichloro[tris(3-phenyl-1-pyrazolyl)methane]manganese, dichloro[tris(3-p-tolyl-1-pyrazolyl)methane]manganese, dichloro[tris(3-cumyl-1-pyrazolyl)methane]manganese, dichloro{tris[3-(trifluoromethyl)-1-pyrazolyl]methane}manganese, dichloro{tris[3-(pentafluoroethyl)-1-pyrazolyl]methane}manganese, dichloro[tris(3-cyclohexyl-1-pyrazolyl)methane]manganese, dichloro[tris(3-adamantyl-1-pyrazolyl)methane]manganese, dichloro[tris(4-chloro-1-pyrazolyl)methane]manganese, dichloro[tris(4-bromo-1-pyrazolyl)methane]manganese, dichloro[tris(4-iodo-1-pyrazolyl)methane]manganese, dichloro[tris(3,5-dimethyl-1-pyrazolyl)methane]manganese, dichloro[tris(3,5-diethyl-1-pyrazolyl)methane]manganese, dichloro[tris(3,5-di-n-propyl-1pyrazolyl)methane]manganese, dichloro[tris(3,5-diisopropyl-1-pyrazolyl)methane]manganese, dichloro[tris(3,5-di-n-butyl-1-pyrazolyl)methane]manganese, dichloro

[tris(3,5-di-sec-butyl-1-pyrazolyl)methane]manganese, dichloro[tris(3,5-diisobutyl-1-pyrazolyl)methane]manganese, dichloro[tris(3,5-di-tert-butyl-1-pyrazolyl)methane]manganese, dichloro[tris(3,5-diphenyl-1-pyrazolyl)methane]manganese, dichloro[tris(5-methyl-3-isopropyl-1-pyrazolyl methane]manganese, dichloro[tris(3-tert-butyl-5-methyl-1-pyrazolyl)methane]manganese, dichloro[tris(5-methyl-3-phenyl-1-pyrazolyl)methane]manganese, dichloro[tris(5-methyl-3-p-tolyl-1-pyrazolyl)methane]manganese, dichloro[tris (3-cumyl-5-methyl-1-pyrazolyl)methane]manganese, dichloro[tris(3-adamantyl-5-methyl-1-pyrazolyl)methane]manganese, dichloro[tris(1-imidazolyl)methane]manganese, dichloro[tris(7-methyl-1-imidazolyl)methane]manganese, dichloro[tris(7-isopropyl-1-imidazolyl)methane]manganese, dichloro[tris(7-tert-butyl-1-imidazolyl)methane]manganese and the like, and transition metal compounds such as compounds in which manganese in these compounds is changed to technetium or rhenium, compounds in which chlorine in these compounds is changed to fluorine, bromine, iodine, methyl, benzyl, methoxy or phenoxy, compounds in which tris in these compounds is changed to bis or tetrakis, and compounds in which methane in these compounds is changed to silane, methylsilane, ethylsilane, tert-butylsilane, phenylsilane, germane, methylgermane, ethylgermane, tert-butylgermane, phenylgermane, amine, phosphine or phosphate.

Specific examples of the compound of the above-mentioned general formula [1] furthermore include dichloro[1,1,1-tris(1-pyrazolyl)ethane]manganese, dichloro[1,1,1-tris(3-methyl-1-pyrazolyl)ethane]manganese, dichloro[1,1,1-tris(4-methyl-1-pyrazolyl)ethane]manganese, dichloro[1,1,1-tris(3-ethyl-1-pyrazolyl)ethane]manganese, dichloro[1,1,1-tris(3-n-propyl-1-pyrazolyl)ethane]manganese, dichloro[1,1,1-tris(3-isopropyl-1-pyrazolyl)ethane]manganese, dichloro[1,1,1-tris(3-n-butyl-1-pyrazolyl)ethane]manganese, dichloro[1,1,1-tris(3-sec-butyl-1-pyrazolyl)ethane]manganese, dichloro[1,1,1-tris(3-isobutyl-1-pyrazolyl)ethane]manganese, dichloro[1,1,1-tris(3-tert-butyl-1-pyrazolyl)ethane]manganese, dichloro[1,1,1-tris(3-phenyl-1-pyrazolyl)ethane]manganese, dichloro[1,1,1-tris(3-p-tolyl-1-pyrazolyl)ethane]manganese, dichloro[1,1,1-tris(3-cumyl-1-pyrazolyl)ethane]manganese, dichloro{1,1,1-tris[3-(trifluoromethyl)-1-pyrazolyl]methane}manganese, dichloro{1,1,1-tris[3-(pentafluoroethyl)-1-pyrazolyl]methane}manganese, dichloro[1,1,1-tris(3-cyclohexyl-1-pyrazolyl)ethane]manganese, dichloro[1,1,1-tris(3-adamantyl-1-pyrazolyl)ethane]manganese, dichloro[1,1,1-tris(4-chloro-1-pyrazolyl)ethane]manganese, dichloro[1,1,1-tris(4-bromo-1-pyrazolyl)ethane]manganese, dichloro[1,1,1-tris(4-iodo-1-pyrazolyl)ethane]manganese, dichloro[1,1,1-tris(3,5-dimethyl-1-pyrazolyl)ethane]manganese, dichloro[1,1,1-tris(3,5-diethyl-1-pyrazolyl)ethane]manganese, dichloro[1,1,1-tris(3,5-di-n-propyl-1-pyrazolyl)ethane]manganese, dichloro[1,1,1-tris(3,5-diisopropyl-1-pyrazolyl)ethane]manganese, dichloro[1,1,1-tris(3,5-di-n-butyl-1-pyrazolyl)ethane]manganese, dichloro[1,1,1-tris(3,5-di-sec-butyl-1-pyrazolyl)ethane]manganese, dichloro[1,1,1-tris(3,5-diisobutyl-1-pyrazolyl)ethane]manganese, dichloro[1,1,1-tris(3,5-di-tert-butyl-1-pyrazolyl)ethane]maganese, dichloro[1,1,1-tris(3,5-diphenyl-1-pyrazolyl)ethane]manganese, dichloro[1,1,1-tris(5-methyl-3-isopropyl-1-pyrazolyl)ethane]manganese, dichloro[1,1,1-tris(3-tert-butyl-5-methyl-1-pyrazolyl)ethane]manganese, dichloro[1,1,1-tris(5-methyl-3-phenyl-1-pyrazolyl)ethane]manganese, dichloro[1,1,1-tris(5-methyl-3-p-tolyl-1-pyrazolyl)ethane]manganese, dichloro[1,1,1-tris(3-cumyl-5-methyl-1-pyrazolyl)ethane]manganese, dichloro[1,1,1-tris(3-adamantyl-5-methyl-1-pyrazolyl)ethane]manganese, dichloro[1,1,1-tris(1-imidazolyl)ethane]manganese, dichloro[1,1,1-tris(7-methyl-1-imidazolyl)ethane]manganese, dichloro[1,1,1-tris(7-isopropyl-1-imidazolyl)ethane]manganese, dichloro[1,1,1-tris(7-tert-butyl-1-imidazolyl)ethane]manganese and the like, and transition metal compounds such as compounds in which manganese in these compounds is changed to technetium or rhenium, compounds in which chlorine in these compounds is changed to fluorine, bromine, iodine, methyl, benzyl, methoxy or phenoxy, compounds in which tris in these compounds is changed to tetrakis, and compounds in which ethane in these compounds is changed to propane, butane, isobutene, pentane, 2-methylbutane, 3-methylbutane or 2,2-dimethylpropane.

Specific examples of the compound of the above-mentioned general formula [1] include [tris(1-pyrazolyl)methane](1,3-butadiene)manganese, [tris(3-methyl-1-pyrazolyl)methane](1,3-butadiene)manganese, [tris(4-methyl-1-pyrazolyl)methane](1,3-butadiene)manganese, [tris(3-ethyl-1-pyrazolyl)methane](1,3-butadiene)manganese, [tris(3-n-propyl-1-pyrazolyl)methane](1,3-butadiene)manganese, [tris(3-isopropyl-1-pyrazolyl)methane](1,3-butadiene)manganese, [tris(3-n-butyl-1-pyrazolyl)methane](1,3-butadiene)manganese, [tris(3-sec-butyl-1-pyrazolyl)methane](1,3-butadiene)manganese, [tris(3-isobutyl-1-pyrazolyl)methane](1,3-butadiene)manganese, [tris(3-tert-butyl-1-pyrazolyl)methane](1,3-butadiene)manganese, [tris(3-phenyl-1-pyrazolyl)methane](1,3-butadiene)manganese, [tris(3-p-tolyl-1-pyrazolyl)methane](1,3-butadiene)manganese, [tris(3-cumyl-1-pyrazolyl)methane](1,3-butadiene)manganese, {tris[3-(trifluoromethyl)-1-pyrazolyl]methane}manganese, {tris[3-(pentafluoroethyl)-1-pyrazolyl]methane}manganese, [tris(3-cyclohexyl-1-pyrazolyl)methane](1,3-butadiene)manganese, [tris(3-adamantyl-1-pyrazolyl)methane](1,3-butadiene)manganese, [tris(4-chloro-1-pyrazolyl)methane](1,3-butadiene)manganese, [tris(4-bromo-1-pyrazolyl)methane](1,3-butadiene)manganese, [tris(4-iodo-1-pyrazolyl)methane](1,3-butadiene)manganese, [tris(3,5-dimethyl-1-pyrazolyl)methane](1,3-butadiene)manganese, [tris(3,5-diethyl-1-pyrazolyl)methane](1,3-butadiene)manganese, [tris(3,5-di-n-propyl-1-pyrazolyl)methane](1,3-butadiene)manganese, [tris(3,5-diisopropyl-1-pyrazolyl)methane](1,3-butadiene)manganese, [tris(3,5-di-n-butyl-1-pyrazolyl)methane](1,3-butadiene)manganese, [tris(3,5-di-sec-butyl-1-pyrazolyl)methane](1,3-butadiene)manganese, [tris(3,5-diisobutyl-1-pyrazolyl)methane](1,3-butadiene)manganese, [tris(3,5-di-tert-butyl-1-pyrazolyl)methane](1,3-butadiene)manganese, [tris(3,5-diphenyl-1-pyrazolyl)methane](1,3-butadiene)manganese, [tris(5-methyl-3-isopropyl-1-pyrazolyl)methane](1,3-butadiene)manganese, [tris(3-tert-butyl-5-methyl-1-pyrazolyl)methane](1,3-butadiene)manganese, [tris(5-methyl-3-phenyl-1-pyrazolyl)methane](1,3-butadiene)manganese, [tris(5-methyl-3-p-tolyl-1-pyrazolyl)methane](1,3-butadiene)manganese, [tris (3-cumyl-5-methyl-1-pyrazolyl)methane](1,3-butadiene)manganese, [tris(3-adamantyl-5-methyl-1-pyrazolyl)methane](1,3-butadiene)manganese, [tris(1-imidazolyl)methane](1,3-butadiene)manganese, [tris(7-methyl-1-imidazolyl)methane](1,3-butadiene)manganese, [tris(7-isopropyl-1-imidazolyl)methane](1,3-butadiene)manganese, [tris(7-tert-butyl-1-imidazolyl)methane](1,3-butadiene)manganese and the like, and transition metal compounds such as compounds in which manganese in these compounds is changed to technetium or rhenium, compounds in which 1,3-butadiene in these compounds is changed to 2,4-heptadiene or 1,4-diphenylbutadiene, compounds in which tris in these compounds is changed to tetrakis, and compounds in which methane in these compounds is changed to silane, methylsilane, ethylsilane, tert-butylsilane, phenylsilane, germane, methylgermane, ethylgermane, tert-butylgermane, phenylgermane, amine, phosphine or phosphate.

Specific examples of the compound of the above-mentioned general formula [2] include di($\mu^2$-oxo)bis{([hydrotris(1-pyrazolyl)borate]manganese}, di($\mu^2$-oxo)bis{[hydrotris(3-methyl-1-pyrazolyl)borate]manganese}, di($\mu^2$-oxo)bis{[hydrotris(4-methyl-1-pyrazolyl)borate]manganese}, di($\mu^2$-oxo)bis{[hydrotris(3-ethyl-1-pyrazolyl)borate]manganese}, di($\mu^2$-oxo)bis{[hydrotris(3-n-propyl-1-pyrazolyl)borate]manganese}, di($\mu^2$-oxo)bis{[hydrotris(3-isopropyl-1-pyrazolyl)borate]manganese}, di($\mu^2$-oxo)bis{[hydrotris(3-n-butyl-1-pyrazolyl)borate]manganese}, di($\mu^2$-oxo)bis{[hydrotris(3-sec-butyl-1-pyrazolyl)borate]manganese}, di($\mu^2$-oxo)bis{[hydrotris(3-isobutyl-1-pyrazolyl)borate]manganese}, di($\mu^2$-oxo)bis{[hydrotris(3-tert-butyl-1-pyrazolyl)borate]manganese}, di($\mu^2$-oxo)bis{[hydrotris(3-phenyl-1pyrazolyl)borate]manganese}, di($\mu^2$-oxo)bis{[hydrotris(3-p-tolyl-1-pyrazolyl)borate]manganese}, di($\mu^2$-oxo)bis{[hydrotris(3-cumyl-1-pyrazolyl)borate]manganese}, di($\mu^2$-oxo)bis{[hydrotris[3-(trifluoromethyl)-1-pyrazolyl]borate}manganese], di($\mu^2$-oxo)bis[{hydrotris[3-(pentafluoroethyl)-1-pyrazolyl]borate}manganese], di($\mu^2$-oxo)bis{[hydrotris(3-cyclohexyl-1-pyrazolyl)borate]manganese}, di($\mu^2$-oxo)bis{[hydrotris(3-adamantyl-1-pyrazolyl)borate]manganese}, di($\mu^2$-oxo)bis{[hydrotris(4-chloro-1-pyrazolyl)borate]manganese}, di($\mu^2$-oxo)bis{[hydrotris(4-bromo-1-pyrazolyl)borate]manganese}, di($\mu^2$-oxo)bis{[hydrotris(4-iodo-1-pyrazolyl)borate]manganese}, di($\mu^2$-oxo)bis{[hydrotris(3,5-dimethyl-1-pyrazolyl)borate]manganese}, di($\mu^2$-oxo)bis{[hydrotris(3,5-diethyl-1-pyrazolyl)borate]manganese}, di($\mu^2$-oxo)bis{[hydrotris(3,5-di-n-propyl-1-pyrazolyl)borate]manganese}, di($\mu^2$-oxo)bis{[hydrotris(3,5-diisopropyl-1-pyrazolyl)borate]manganese}, di($\mu^2$-oxo)bis{[hydrotris(3,5-di-n-butyl-1-pyrazolyl)borate]manganese}, di($\mu^2$-oxo)bis{[hydrotris(3,5-di-sec-butyl-1-pyrazolyl)borate]manganese}, di($\mu^2$-oxo)bis{[hydrotris(3,5-diisobutyl-1-pyrazolyl)borate]manganese}, di($\mu^2$-oxo)bis{[hydrotris(3,5-di-tert-butyl-1-pyrazolyl)borate]manganese}, di($\mu^2$-oxo)bis{[hydrotris(3,5-diphenyl-1-pyrazolyl)borate]manganese}, di($\mu^2$-oxo)bis{[hydrotris(5-methyl-3-isopropyl-1-pyrazolyl)borate]manganese}, di($\mu^2$-oxo)bis{[hydrotris(3-tert-butyl-5-methyl-1-pyrazolyl)borate]manganese}, di($\mu^2$-oxo)bis{[hydrotris(5-methyl-3-phenyl-1-pyrazolyl)borate]manganese}, di($\mu^2$-oxo)bis{[hydrotris(5-methyl-3-p-tolyl-1-pyrazolyl)borate]manganese}, di($\mu^2$-oxo)bis{[hydrotris(3-cumyl-5-methyl-1-pyrazolyl)borate]manganese}, di($\mu^2$-oxo)bis{[hydrotris(3-adamantyl-5-methyl-1-pyrazolyl)borate]manganese}, di($\mu^2$-oxo)bis{[hydrotris(1-imidazolyl)borate]manganese}, di($\mu^2$-oxo)bis{[hydrotris(7-methyl-1-imidazolyl)borate]manganese}, di($\mu^2$-oxo)bis{[hydrotris(7-isopropyl-1-imidazolyl)borate]manganese}, di($\mu^2$-oxo)bis{[hydrotris(7-tert-butyl-1-imidazolyl)borate]manganese} and transition metal compounds such as compounds in which di($\mu^2$-oxo) in these compounds is changed to di($\mu^2$-hydroxy), di($\mu^2$-methoxy), di($\mu^2$-isopropoxy), di($\mu^2$-tert-butyloxy), di($\mu^2$-phenoxy), di($\mu^2$-acetyl), di($\mu^2$-acetate), di($\mu^2$-benzoate), ($\mu^2$-peroxo), ($\mu^2$-disulfide) or ($\mu^2$-azide), compounds in which manganese in these compounds is changed to technetium or rhenium, compounds in which hydro in these compounds is changed to methyl, ethyl, n-propyl, isopropyl, n-butyl, sec-butyl, isobutyl, tert-butyl, phenyl, p-tolyl, cumyl, pyrazolyl, 3-methylpyrazolyl, 4-methylpyrazolyl, 3-ethylpyrazolyl, 3-n-propylpyrazolyl, 3-isopropylpyrazolyl, 3-n-butylpyrazolyl, 3-sec-butylpyrazolyl, 3-isobutylpyrazolyl, 3-tert-butylpyrazolyl, 3-phenylpyrazolyl, 3-p-tolylpyrazolyl, 3-cumylpyrazolyl, 3-(trifluoromethyl)pyrazolyl, 3-(pentafluoroethyl)pyrazolyl, 3-cyclohexylpyrazolyl, 3-adamantylpyrazolyl, 4-chloropyrazolyl, 4-bromopyrazolyl, 4-iodopyrazolyl, 3,5-dimethylpyrazolyl, 3,5-diethylpyrazolyl, 3,5-di-n-propylpyrazolyl, 3,5-diisopropylpyrazolyl, 3,5-di-n-butylpyrazolyl, 3,5-di-sec-butylpyrazolyl, 3,5-diisobutylpyrazolyl, 3,5-di-tert-butylpyrazolyl, 3,5-diphenylpyrazolyl, 5-methyl-3-isopropylpyrazolyl, 3-tert-butyl-5-methylpyrazolyl, 5-methyl-3-phenylpyrazolyl, 5-methyl-3-para-tolylpyrazolyl, 3-cumyl-5-methylpyrazolyl, 3-adamantyl-5-methylpyrazolyl, imidazolyl, 7-methylimidazolyl, 7-isopropylimidazolyl or 7-tert-butylimidazolyl, and compounds in which borate in these compounds is changed to aluminate.

Specific examples of the compound of the above-mentioned general formula [2] include di($\mu^2$-oxo)bis{[dihydrobis(1-pyrazolyl)borate]manganese}, di($\mu^2$-oxo)bis{[dihydrobis(3-methyl-1-pyrazolyl)borate]manganese}, di($\mu^2$-oxo)bis{[dihydrobis(4-methyl-1-pyrazolyl)borate]manganese}, di($\mu^2$-oxo)bis{[dihydrobis(3-ethyl-1-pyrazolyl)borate]manganese}, di($\mu^2$-oxo)bis{[dihydrobis(3-n-propyl-1-pyrazolyl)borate]manganese}, di($\mu^2$-oxo)bis{[dihydrobis(3-isopropyl-1-pyrazolyl)borate]manganese}, di($\mu^2$-oxo)bis{[dihydrobis(3-n-butyl-1-pyrazolyl)borate]manganese}, di($\mu^2$-oxo)bis{[dihydrobis(3-sec-butyl-1-pyrazolyl)borate]manganese}, di($\mu^2$-oxo)bis{[dihydrobis(3-isobutyl-1-pyrazolyl)borate]manganese}, di($\mu^2$-oxo)bis{[dihydrobis(3-tert-butyl-1-pyrazolyl)borate]manganese}, di($\mu^2$-oxo)bis{[dihydrobis(3-phenyl-1-pyrazolyl)borate]manganese}, di($\mu^2$-oxo)bis{[dihydrobis(3-p-tolyl-1-pyrazolyl)borate]manganese}, di($\mu^2$-oxo)bis{[dihydrobis(3-cumyl-1-pyrazolyl)borate]manganese}, di($\mu^2$-oxo)bis[{dihydrobis[3-(trifluoromethyl)-1-pyrazolyl]borate}manganese], di($\mu^2$-oxo)bis[{dihydrobis[3-(pentafluoroethyl)-1-pyrazolyl]borate}manganese], di($\mu^2$-oxo)bis{[dihydrobis(3-cyclohexyl-1-pyrazolyl)borate]manganese}, di($\mu^2$-oxo)bis{[dihydrobis(3-adamantyl-1-pyrazolyl)borate]manganese}, di($\mu^2$-oxo)bis{[dihydrobis(4-chloro-1-pyrazolyl)borate]manganese}, di($\mu^2$-oxo)bis{[dihydrobis(4-bromo-1-pyrazolyl)borate]manganese}, di($\mu^2$-oxo)bis{[dihydrobis(4-iodo-1-pyrazolyl)borate]manganese}, di($\mu^2$-oxo)bis{[dihydrobis(3,5-dimethyl-1-pyrazolyl)borate]manganese}, di($\mu^2$-oxo)bis{[dihydrobis(3,5-diethyl-1-pyrazolyl)borate]manganese}, di($\mu^2$-oxo)bis{[dihydrobis(3,5-di-n-propyl-1-pyrazolyl)borate]manganese}, di($\mu^2$-oxo)bis{[dihydrobis(3,5-diisopropyl-1-pyrazolyl)borate]manganese}, di($\mu^2$-oxo)bis{[dihydrobis(3,5-di-n-butyl-1-pyrazolyl)borate]manganese}, di($\mu^2$-oxo)bis{[dihydrobis(3,5-di-sec-butyl-1-pyrazolyl)borate]manganese}, di($\mu^2$-oxo)bis{[dihydrobis(3,5-diisobutyl-1-pyrazolyl)borate]manganese}, di($\mu^2$-oxo)bis{[dihydrobis(3,5-di-tert-butyl-1-pyrazolyl)borate]manganese}, di($\mu^2$-oxo)bis{[dihydrobis(3,5-diphenyl-1-pyrazolyl)borate]manganese}, di($\mu^2$-oxo)bis{[dihydrobis(5-methyl-3-isopropyl-1-pyrazolyl)borate]manganese}, di($\mu^2$-oxo)bis{[dihydrobis(3-tert-butyl-5-methyl-1-pyrazolyl)borate]manganese}, di($\mu^2$-oxo)bis{[dihydrobis(5-methyl-3-phenyl-1-pyrazolyl)borate]manganese}, di($\mu^2$-oxo)bis{[dihydrobis(5-methyl-3-para-tolyl-1-pyrazolyl)borate]manganese}, di($\mu^2$-oxo)bis{[dihydrobis(3-cumyl-5-methyl-1-pyrazolyl)borate]manganese}, di($\mu^2$-oxo)bis{[dihydrobis(3-adamantyl-5-methyl-1-pyrazolyl)borate]manganese}, di($\mu^2$- oxo)bis{[dihydrobis(1-imidazolyl)borate]manganese}, di($\mu^2$-oxo)bis{[dihydrobis(7-methyl-1-imidazolyl)borate] manganese}, di($\mu^2$-oxo)bis{[dihydrobis(7-isopropyl-1-imidazolyl)borate]manganese}, di($\mu^2$-oxo)bis{[dihydrobis(7-tert-butyl-1-imidazolyl)borate]manganese}, and transition metal compounds such as compound in which di($\mu^2$-oxo) in these compounds is changed to di($\mu^2$-hydroxy), di($\mu^2$-methoxy), di($\mu^2$-isopropoxy), di($\mu^2$-tert-butyloxy), di($\mu^2$-phenoxy), di($\mu^2$-acetyl), di($\mu^2$-acetate), di($\mu^2$-benzoate), ($\mu^2$-peroxo), ($\mu^2$-disulfide) or ($\mu^2$-azide), compounds in which manganese in these compounds is changed to technetium or rhenium, compounds in which hydro in these compounds is changed to methyl, ethyl, n-propyl, isopropyl, n-butyl, sec-butyl, isobutyl, tert-butyl, phenyl, para-tolyl or cumyl, and compounds obtained by changing borate in these compounds by aluminate.

Specific examples of the compound of the above-mentioned general formula [2] further include di($\mu^2$-oxo)bis{chloro[tris(1-pyrazolyl)methane]manganese}, di($\mu^2$-oxo)bis{chloro[tris(3-methyl-1-pyrazolyl)methane]manganese}, di($\mu^2$-oxo)bis{chloro[tris(4-methyl-1-pyrazolyl)methane]manganese}, di($\mu^2$-oxo)bis{chloro[tris(3-ethyl-1-pyrazolyl)methane]manganese}, di($\mu^2$-oxo)bis{chloro[tris(3-n-propyl-1-pyrazolyl)methane]manganese}, di($\mu^2$-oxo)bis{chloro[tris(3-isopropyl-1-pyrazolyl)methane]manganese}, di($\mu^2$-oxo)bis{chloro[tris(3-n-butyl-1-pyrazolyl)methane]manganese}, di($\mu^2$-oxo)bis{chloro[tris(3-sec-butyl-1-pyrazolyl)methane]manganese}, di($\mu^2$-oxo)bis{chloro[tris(3-isobutyl-1-pyrazolyl)methane]manganese}, di($\mu^2$-oxo)bis{chloro[tris(3-tert-butyl-1-pyrazolyl)methane]manganese}, di($\mu^2$-oxo)bis{chloro[tris(3-phenyl-1-pyrazolyl)methane]manganese}, di($\mu^2$-oxo)bis{chloro[tris(3-p-tolyl-1-pyrazolyl)methane]manganese}, di($\mu^2$-oxo)bis{chloro[tris(3-cumyl-1-pyrazolyl)methane]manganese}, di($\mu^2$-oxo)bis{chloro{tris[3-(trifluoromethyl)-1-pyrazolyl]methane}manganese}, di($\mu^2$-oxo)bis{chloro{tris[3-(pentafluoroethyl)-1-pyrazolyl]methane}manganese}, di($\mu^2$-oxo)bis{chloro[tris(3-cyclohexyl-1-pyrazolyl)methane]manganese}, di($\mu^2$-oxo)bis{chloro[tris(3-adamantyl-1-pyrazolyl)methane]manganese}, di($\mu^2$-oxo)bis{chloro[tris(4-chloro-1-pyrazolyl)methane]manganese}, di($\mu^2$-oxo)bis{chloro[tris(4-iodo-1-pyrazolyl)methane]manganese}, di($\mu^2$-oxo)bis{chloro[tris(3,5-dimethyl-1-pyrazolyl)methane]manganese}, di($\mu^2$-oxo)bis{chloro[tris(3,5-diethyl-1-pyrazolyl)methane]manganese}, di($\mu^2$-oxo)bis{chloro[tris(3,5-di-n-propyl-1-pyrazolyl)methane]manganese}, di($\mu^2$-oxo)bis{chloro[tris(3,5-diisopropyl-1-pyrazolyl)methane]manganese}, di($\mu^2$-oxo)bis{chloro[tris(3,5-di-n-butyl-1-pyrazolyl)methane]manganese}, di($\mu^2$-oxo)bis{chloro[tris(3,5-di-sec-butyl-1-pyrazolyl)methane]manganese}, di($\mu^2$-oxo)bis{chloro[tris(3,5-diisobutyl-1-pyrazolyl)methane]manganese}, di($\mu^2$-oxo)bis{chloro[tris(3,5-di-tert-butyl-1-pyrazolyl)methane]manganese}, di($\mu^2$-oxo)bis{chloro[tris(3,5-diphenyl-1-pyrazolyl)methane]manganese}, di($\mu^2$-oxo)bis{chloro[tris(5-methyl-3-isopropyl-1-pyrazolyl)methane]manganese}, di($\mu^2$-oxo)bis{chloro[tris(3-tert-butyl-5-methyl-1-pyrazolyl)methane]manganese}, di($\mu^2$-oxo)bis{chloro[tris(5-methyl-3-phenyl-1-pyrazolyl)methane]manganese}, di($\mu^2$-oxo)bis{chloro[tris(5-methyl-3-p-tolyl-1-pyrazolyl)methane]manganese}, di($\mu^2$-oxo)bis{chloro[tris(3-cumyl-5-methyl-1-pyrazolyl)methane]manganese}, di($\mu^2$-oxo)bis{chloro[tris(3-adamantyl-5-methyl-1-pyrazolyl)methane]manganese}, di($\mu^2$-oxo)bis{chloro[tris(1-imidazolyl)methane]manganese}, di($\mu^2$-oxo)bis{chloro[tris(7-methyl-1-imidazolyl)methane]manganese}, di($\mu^2$-oxo)bis{chloro[tris(7-isopropyl-1-imidazolyl)methane] manganese}, di($\mu^2$-oxo)bis{chloro[tris(7-tert-butyl-1-imidazolyl)methane]manganese}, and transition metal compounds such as compounds in which di($\mu^2$-oxo) in these compounds is changed to di($\mu^2$-hydroxy), di($\mu^2$-methoxy), di($\mu^2$-isopropoxy), di($\mu^2$-tert-butyloxy), di($\mu^2$-phenoxy), di($\mu^2$-acetyl), di($\mu^2$-acetate), di($\mu^2$-benzoate), ($\mu^2$-peroxo), ($\mu^2$-disulfide) or ($\mu^2$-azide), compounds in which manganese in these compounds is changed to technetium or rhenium, compounds in which chlorine in these compounds is changed to fluorine, bromine, iodine, methyl, benzyl, methoxy or phenoxy, compounds in which tris in these compounds is changed to bis or tetrakis, and compounds in which methane in these compounds is changed to silane, methylsilane, ethylsilane, tert-butylsilane, phenylsilane, germane, methylgermane, ethylgermane, tert-butylgermane, phenylgermane, amine, phosphine or phosphite.

Specific examples of the compound of the above-mentioned general formula [2] furthermore include di($\mu^2$-oxo)bis{dichloro[1,1,1-tris(1-pyrazolyl)ethane]manganese}, di($\mu^2$-oxo)bis{dichloro[1,1,1-tris(3-methyl-1-pyrazolyl)ethane]manganese}, di($\mu^2$-oxo)bis{dichloro[1,1,1-tris(4-methyl-1-pyrazolyl)ethane]manganese}, di($\mu^2$-oxo)bis{dichloro[1,1,1-tris(3-ethyl-1-pyrazolyl)ethane]manganese}, di($\mu^2$-oxo)bis{dichloro[1,1,1-tris(3-n-propyl-1-pyrazolyl)ethane]manganese}, di($\mu^2$-oxo)bis{dichloro[1,1,1-tris(3-isopropyl-1-pyrazolyl)ethane]manganese}, di($\mu^2$-oxo)bis{dichloro[1,1,1-tris(3-n-butyl-1-pyrazolyl)ethane]manganese}, di($\mu^2$-oxo)bis{dichloro[1,1,1-tris(3-sec-butyl-1-pyrazolyl)ethane]manganese}, di($\mu^2$-oxo)bis{dichloro[1,1,1-tris(3-isobutyl-1-pyrazolyl)ethane]manganese}, di($\mu^2$-oxo)bis{dichloro[1,1,1-tris(3-tert-butyl-1-pyrazolyl)ethane]manganese}, di($\mu^2$-oxo)bis{dichloro[1,1,1-tris(3-phenyl-1-pyrazolyl)ethane]manganese}, di($\mu^2$-oxo)bis{dichloro[1,1,1-tris(3-para-tolyl-1-pyrazolyl)ethane]manganese}, di($\mu^2$-oxo)bis{dichloro[1,1,1-tris(3-cumyl-1-pyrazolyl)ethane]manganese}, di($\mu^2$-oxo)bis{chloro{tris[3-(trifluoromethyl)-1-pyrazolyl]ethane}manganese}, di($\mu^2$-oxo)bis{chloro{tris[3-(pentafluoroethyl)-1-pyrazolyl]ethane}manganese}, di($\mu^2$-oxo)bis{dichloro[1,1,1-tris(3-cyclohexyl-1-pyrazolyl)ethane]manganese}, di($\mu^2$-oxo)bis{dichloro[1,1,1-tris(3-adamantyl-1-pyrazolyl)ethane]manganese}, di($\mu^2$-oxo)bis{dichloro[1,1,1-tris(4-chloro-1-pyrazolyl)ethane]manganese}, di($\mu^2$-oxo)bis{dichloro[1,1,1-tris(4-bromo-1-pyrazolyl)ethane]manganese}, di($\mu^2$-oxo)bis{dichloro[1,1,1-tris(4-iodo-1-pyrazolyl)ethane]manganese}, di($\mu^2$-oxo)bis{dichloro[1,1,1-tris(3,5-dimethyl-1-pyrazolyl)ethane]manganese}, di($\mu^2$-oxo)bis{dichloro[1,1,1-tris(3,5-diethyl-1-pyrazolyl)ethane]manganese}, di($\mu^2$-oxo)bis{dichloro[1,1,1-tris(3,5-di-n-propyl-1-pyrazolyl)ethane]manganese}, di($\mu^2$-oxo)bis{dichloro[1,1,1-tris(3,5-diisopropyl-1-pyrazolyl)ethane]manganese}, di($\mu^2$-oxo)bis{dichloro[1,1,1-tris(3,5-di-n-butyl-1-pyrazolyl)ethane]manganese}, di($\mu^2$-oxo)bis{dichloro[1,1,1-tris(3,5-di-sec-butyl-1-pyrazolyl)ethane]manganese}, di($\mu^2$-oxo)bis{dichloro[1,1,1-tris(3,5-diisobutyl-1-pyrazolyl)ethane]manganese}, di($\mu^2$-oxo)bis{dichloro[1,1,1-tris(3,5-di-tert-butyl-1-pyrazolyl)ethane]manganese}, di($\mu^2$-oxo)bis{dichloro[1,1,1-tris(3,5-diphenyl-1-pyrazolyl)ethane]manganese}, di($\mu^2$-oxo)bis{dichloro[1,1,1-tris(5-methyl-3-isopropyl-1-pyrazolyl)ethane]manganese}, di($\mu^2$-oxo)bis{dichloro[1,1,1-tris(3-tert-butyl-5-methyl-1-pyrazolyl)ethane]manganese}, di($\mu^2$-oxo)bis{dichloro[1,1,1-tris(5-methyl-3-phenyl-1-pyrazolyl)ethane]manganese}, di($\mu^2$-oxo)bis{dichloro[1,1,1-tris(5-methyl-3-para-tolyl-1-pyrazolyl)ethane]manganese}, di($\mu^2$-oxo)bis{dichloro[1,1,1-tris(3-cumyl-5-methyl-1-pyrazolyl)ethane]manganese}, di($\mu^2$-oxo)bis{dichloro[1,1,1-tris(3-adamantyl-5-methyl-1-pyrazolyl)ethane]manganese}, di($\mu^2$-oxo)bis{dichloro[1,1,1-tris(1-imidazolyl)ethane]manganese}, di($\mu^2$-oxo)bis{dichloro[1,1,1-tris(7-methyl-1-imidazolyl)ethane]manganese}, di($\mu^2$-oxo)bis{dichloro[1,1,1-tris(7-isopropyl-1-imidazolyl)ethane]manganese}, di($\mu^2$-oxo)bis{dichloro[1,1,1-tris(7-tert-butyl-1-imidazolyl)ethane]manganese}, and transition metal compound such as compounds in which di($\mu^2$-oxo) in these compounds is changed to di($\mu^2$-hydroxy), di($\mu^2$-methoxy), di($\mu^2$-isopropoxy), di($\mu^2$-tert-butyloxy), di($\mu^2$-phenoxy), di($\mu^2$-acetyl), di($\mu^2$-acetate), di($\mu^2$-benzoate), ($\mu^2$-peroxo), ($\mu^2$-disulfide) or ($\mu^2$-azide), compounds in which manganese in these compounds is changed to technetium or rhenium, compounds in which chlorine in these compounds is changed to fluorine, bromine, iodine, methyl, benzyl, methoxy or phenoxy, compounds in which tris in these compounds is changed to bis or tetrakis, and compounds in which ethane in these compounds is changed to propane, butane, isobutene, pentane, 2-methylbutane, 3-methylbutane or 2,2-dimethylpropane.

Further, there can be exemplified compounds obtained by coordinating to the transition metal (manganese, technetium or rhenium) of specific compounds above-mentioned represented by the general formulae [1] and [2] a neutral ligand selected from, for example, ethers such as diethyl ether, tetrahydrofuran and dimethoxyethane, amines such as triethylamine, N,N,N',N'-tetramethylethylenediamine, pyridines such as pyridine, 2,6-dimethylpyridine and quinoline, pyrazole, substituted pyrazoles such as 3-methylpyrazole, 4-methylpyrazole, 5-methylpyrazole, 3-ethylpyrazole, 3-n-propylpyrazole, 3-isopropylpyrazole, 3-n-butylpyrazole, 3-sec-butylpyrazole, 3-isobutylpyrazole, 3-tert-butylpyrazole, 3-phenylpyrazole, 3-p-tolylpyrazole, 3-cumylpyrazole, 3-(trifluoromethyl)pyrazole, 3-(pentafluoroethyl)pyrazole, 3-cyclohexylpyrazole, 3-adamantylpyrazole, 4-chloropyrazole, 4-bromopyrazole, 4-iodopyrazole, 3,5-dimethylpyrazole, 3,5-diethylpyrazole, 3,5-di-n-propylpyrazole, 3,5-diisopropylpyrazole, 3,5-di-n-butylpyrazole, 3,5-di-sec-butylpyrazole, 3,5-diisobutylpyrazole, 3,5-di-tert-butylpyrazole, 3,5-diphenylpyrazole, 5-methyl-3-isopropylpyraozole, 3-tert-butyl-5-methylpyrazole, 5-methyl-3-phenylpyrazole, 5-methyl-3-p-tolylpyrazole, 3-cumyl-5-methylpyrazole, 3-adamantyl-5-methylpyrazole, imidazole, 7-methylimidazole, 7-isopropylimidazole and 7-tert-butylimidazole, phosphines such as trimethylphosphine, triethylphosphine, triphenylphoshpine, dimethylphenylphosphine, methyldiphenylphosphine, 1,2-bis(dimethylphosphino)ethane, 1,2-bis(diethylphosphino)ethane, 1,2-bis(diphenylphosphino)ethane and 1,3-bis(diphenylphosphino)propane, nitrites such as acetonitrile and benzonitrile; endo-on type nitrogen molecule; carbon monoxide; olefins such as ethylene, propylene and the like; dienes such as butadiene, 2,4-hexadiene and 1,4-diphenylbutadiene; ketones such as acetone and acetophenone; and side-on type nitrogen molecule.

In the present invention, these transition metal compounds may be used alone or in combination of two or more.

Such transition metal compounds are produced, for example, by a method described in J. Am. Chem. Soc., Vol. 89, p. 3904–3905 (1967).

The catalyst for addition polymerization of the present invention is obtained by contacting the above-mentioned transition meta compound with the following (B) and/or the following (C).

(B) one or more aluminum compounds selected from the following (B1) to (B3),
(B1) organoaluminum compounds of the general formula $E^1_a AlZ_{3-a}$,
(B2) cyclic aluminoxanes having a structure of the general formula $\{—Al(E^2)-O—\}_b$,
(B3) linear aluminoxanes having a structure of the general formula $E^3\{—Al(E^3)-O—\}_c AlE^3_2$,
(wherein, each of $E^1$, $E^2$ and $E^3$ represents a hydrocarbon group, and all of $E^1$s, all of $E^2$s and all of $E^3$s maybe the same or different. Z represents a hydrogen atom or halogen atom, all of Zs may be the same or different. a represents a number satisfying $0<a\leq 3$, b represents an integer of 2 or more, and c represents an integer of 1 or more.).

(C) one or more boron compounds selected from the following (C1) to (C3),
(C1) boron compounds of the general formula $BQ^1Q^2Q^3$,
(C2) boron compounds of the general formula $G^+(BQ^1Q^2Q^3Q^4)^-$,
(C3) boron compounds of the general formula $(L-H)^+(BQ^1Q^2Q^3Q^4)^-$,
(wherein, B represents a boron atom of tri-valent state, $Q^1$ to $Q^4$ represent a halogen atom, hydrocarbon group, halogenated hydrocarbon group, substituted silyl group, alkoxy group or di-substituted amino group, and they may be the same or different. $G^+$ represents an inorganic or organic cation, L represents a neutral Lewis base, and $(L-H)^+$ represents a Brønsted acid.).

The catalyst for addition polymerization will be described further in detail below.

(B) Aluminum Compound

As the aluminum compound (B), one or more aluminum compounds selected from the above-mentioned (B1) to (B3) are used.

As the hydrocarbon group represented by $E^1$, $E^2$ and $E^3$, hydrocarbon groups having 1 to 8 carbon atoms are preferably, and an alkyl group is more preferable.

Specific examples of the organoaluminum compound (B1) of the general formula $E^1_a AlZ_{3-a}$ include trialkylaluminums such as trimethylaluminum, triethylaluminum, tripropylaluminum, triisobutylaluminum, trihexylaluminum and the like; dialkylaluminum chloride such as dimethylaluminum chloride, diethylaluminum chloride, dipropylaluminum chloride, diisobutylaluminum chloride, dihexylaluminum chloride and the like; alkylaluminum dichlorides such as methylaluminum dichloride, ethylaluminum dichloride, propylaluminum dichloride, isobutylaluminum dichloride, hexylaluminum dichloride and the like, and dialkylaluminum hydrides such as dimethyaluminum hydride, diethylaluminum hydride, dipropylaluminum hydride, dilsobutylaluminum hydride, dihexylaluminum hydride and the like.

Preferable are trialkylaluminums, more preferable is triethylaluminum or triisobutylaluminum.

Specific examples of $E^2$ and $E^3$ in the cyclic aluminoxane (B2) having a structure of the general formula $\{—Al(E^2)-O—\}_b$, and the linear aluminoxanes (B3) having a structure of the general formula $E^3\{—Al(E^3)-O—\}_c AlE^3_2$ include alkyl groups such as a methyl group, ethyl group, n-propyl group, isopropyl group, n-butyl group, isobutyl group, n-pentyl group, neopentyl group and the like. b represents an integer of 2 or more, and c represents an integer of 1 or more. Preferably, $E^2$ and $E^3$ represent a methyl group or isobutyl group, b is 2 to 40, and c is 1 to 40.

The above-mentioned aluminoxane is produced by various methods. The method is not particularly restricted, and the aluminoxane may advantageously be produced according to known methods. For example, it is produced by contacting a solution prepared by dissolving a trialkylaluminum (e.g., trimethylaluminum) in a suitable organic solvent (e.g., benzene, aliphatic hydrocarbon) with water.

Further, a method is exemplified in which an aluminoxane is produced by contacting a trialkylaluminum (e.g., trimethylaluminum) with a metal salt containing crystal water (e.g., copper sulfate hydrate).

It is considered that the aluminoxane prepared by such methods is usually a mixture of a cyclic aluminoxane and a linear aluminoxane.

(C) Boron Compound

As the boron compound (C), one or more boron compounds selected from (C1), (C2) and (C3) above-mentioned are used.

In the boron compound (C1) of the general formula $BQ^1Q^2Q^3$, B represents a trivalent boron atom, and $Q^1$ to $Q^3$ represent a halogen atom, hydrocarbon group, halogenated hydrocarbon group, substituted silyl group, alkoxy group or di-substituted amino group, and they may be the same or different. $Q^1$ to $Q^3$ preferably represent a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms, or an amino group having 1 to 20 carbon atoms, and $Q^1$ to $Q^3$ more preferably represent a halogen atom, a hydrocarbon group having 1 to 20 carbon atoms or a halogenated hydrocarbon group having 1 to 20 carbon atoms. Further preferably, $Q^1$ to $Q^4$ represent a fluorinated hydrocarbon group having 1 to 20 carbon atoms containing at least one fluorine atom, and particularly preferably, $Q^1$ to $Q^4$ represent a fluorinated aryl group having 6 to 20 carbon atoms containing at least fluorine atom.

Specific examples of the compound (C1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenylbis(pentafluorophenyl)borane and the like, and tris (pentafluorophenyl)borane is most preferable.

In the boron compound (C2) of the general formula $G^+(BQ^1Q^2Q^3Q^4)^-$, $G^+$ represents an inorganic or organic cation, B represents a trivalent boron atom, and $Q^1$ to $Q^4$ are as defined for $Q^1$ to $Q^3$ in the above-mentioned (C1).

Specific examples of the inorganic cation $G^+$ include a ferrocenium cation, alkyl-substituted ferrocenium cation, silver cation and the like, and specific examples of the organic cation $G^+$ include a triphenylcarbenium cation and the like. $G^+$ represents preferably a carbenium cation, and particularly preferably a triphenylcarbenium cation. Examples of $(BQ^1Q^2Q^3Q^4)^-$ include tetrakis (pentafluorophenyl)borate, tetrakis(2,3,5,6-tetrafluoropheny)borate, tetrakis(2,3,4,5-tetrafluorophenyl) borate, tetrakis(3,4,5-trifluorophenyl)borate, tetrakis(2,3,4-trifluorophenyl)borate, phenyltris(pentafluorophenyl)borate, tetrakis(3,5-bistrifluoromethylphenyl)borate and the like.

Specific combinations thereof include ferrocenium tetrakis(pentafluorophenyl)borate, 1,1'-dimethylferrocenium tetrakis(pentafluorophenyl)borate, silver tetrakis (pentafluorophenyl)borate, tripheylcarbeniumtetrakis (pentafluorophenyl)borate, triphenylcarbeniumtetrakis(3,5-bistrifluoromethylphenyl)borate and the like, and triphenylcarbeniumtetrakis(pentafluorophenyl)borate is most preferable.

In the boron compound (C3) of the general formula $(L-H)^+(BQ^1Q^2Q^3Q^4)^-$, L represents a neutral Lewis base and $(L-H)^+$ represents a Brønsted acid, B represents a trivalent boron atom, and $Q^1$ to $Q^4$ are as defined for $Q^1$ to $Q^3$ in the above-mentioned (C1).

Specific examples of the Brønsted acid $(L-H)^+$ in the compound of the general formula $(L-H)^+(BQ^1Q^2Q^3Q^4)^-$ include trialkyl-substituted ammoniums, N,N-dialkylaniliniums, dialkylammoniums, triarylphosphoniums and the like, and as $(BQ^1Q^2Q^3Q^4)^-$, the same moieties as described above are listed.

Specific combinations thereof include triethylammoniumtetrakis(pentafluorophenyl)borate, tripropylammonium tetrakis(pentafluorophenyl)borate, tri(n-butyl)ammoniumtetrakis(pentafluorophenyl)borate, tri(n-butyl)ammoniumtetrakis (3,5-bistrifluoromethylphenyl) borate, N,N-dimethylaniliniumtetrakis(pentafluorophenyl) borate, N,N-diethylanilinium tetrakis(pentafluorophenyl) borate, N,N-2,4,6-pentamethylaniliniumtetrakis (pentafluorophenyl)borate, N,N-dimethylaniliniumtetrakis (3,5-bistrifluoromethylphenyl)borate, diisopropylammoniumtetrakis(pentafluorophenyl)borate, dicyclohexyammoniumtetrakis(pentafluorophenyl)borate, triphenylphosphoniumtetrakis(pentafluorophenyl)borate, tri(methylphenyl) phosphoniumtetrakis(pentafluorophenyl)borate, tri (dimethylphenyl)phosphoniumtetrakis(pentafluorophenyl) borate and the like are listed, and most preferable is tri(n-butyl)ammonium tetrakis(pentafluorophenyl)borate, or N,N-dimethylaniliniumtetrakis(pentafluorophenyl)borate.

Contact in producing a stereoregular α-olefin polymerization catalyst by allowing the above-mentioned transition metal compound to contact with a co-catalyst for activation may be conducted by any means forming a catalyst by contacting the transition metal compound with the co-catalyst for activation, and there are adopted a method in which a transition metal compound and a co-catalyst for activation are previously diluted by a solvent or not diluted, before they are mixed for mutual contact, and a method in which a transition metal compound and a co-catalyst for activation are separately fed into a polymerization vessel for mutual contact thereof. As the co-catalyst for activation, a plurality of compounds may be combined and used, however, it is needless to say that a part of which may be previously mixed and used, or they may be separately fed into a polymerization vessel and used.

It is desirable to use components so that the molar ratio of [the aluminum compound (B) in terms of Al atom]/ [transition metal compound (A) in terms of transition metal atom] is from 0.1 to 10000, preferably from 5 to 2000, and the molar ratio of boron compound (C)/[transition metal compound (A) in terms of transition metal atom] is from 0.01 to 100, preferably from 0.5 to 10.

The concentrations of components when they are used in the form of a solution, or suspension or slurry in a solvent are appropriately selected depending on the ability of an apparatus for feeding components into a polymerization reactor, and it is generally desirable that the concentration of the transition metal compound (A) in terms of transition metal atom is usually from 0.001 to 200 mmol/L, more preferably from 0.001 to 100 mmol/L, further preferably from 0.05 to 50 mmol/L, the concentration of the organoaluminum compound (B) in terms of Al atom is usually from 0.01 to 5000 mmol/L, more preferably from 0.1 to 2500 mmol/L, further preferably 0.1 to 2000 mmol/L, and the concentration of the boron compound (C) is usually from 0.001 to 500 mmol/L, more preferably from 0.01 to 250 mmol/L, further preferably from 0.05 to 100 mmol/L.

[Polymerization]

In the present invention, a addition polymer can be produced by polymerizing an addition polymerizable monomer with the catalyst for addition polymerization obtained by contacting the above-mentioned transition metal compound (A) with a co-catalyst for activation. When the catalyst obtained by contacting the transition metal compound (A) with the aluminum compound (B) is used as the catalyst for addition polymerization, the above-mentioned cyclic aluminoxane (B2) and/or linear aluminoxane (B3) is preferably used as (B). As other preferable embodiments of the catalyst, catalysts obtained by contact the transition metal compound (A), the aluminum compound (B) and the boron compound (C) are listed, and the above-mentioned (B1) is easily used as (B) in this case.

The addition polymerizable monomer used in the present invention includes preferably olefins up to 20 carbon atoms such as monoolefins having 2 to 20 carbon atoms and diolefins having 4 to 20 carbon. Two or more monomers can also be used simultaneously. Examples of the monoolefins 2 to 20 carbon atoms include ethylene and α-monoolefins (hereinafter, referred to as α-olefins) such as propylene, 1-butene, 1-pentene, 1-hexane, 1-heptene, 1-octane, 1-nonene, 1-decene, 3-methyl-1-butene, 3-methyl-1-pentene 4-methyl-1-pentene 5-methyl-1-hexene and the like, styrenes such as styrene, p-methylstyrene, p-tert-butylstyrene and the like, vinylcyclohexane and the like, but the scope of the invention is not limited to them. Examples of the diolefin include non-conjugated dienes such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene; conjugated dienes such as 1,3-butadiene, isoprene, 1,3-hexadiene, 1,3-octadiene, 1,3-cyclooctadiene, 1,3-cyclohexadiene; and the like.

When copolymerization using ethylene is carried out, specific examples of preferable combination of monomers include ethylene and propylene, ethylene and 1-butene, ethylene and 1-hexene, ethylene and 1-octene, ethylene and styrene, ethylene and vinylcyclohexane and the like, but should not be limited thereto. The present invention is preferably applied to production of copolymers of ethylene and an α-olefin having 3 to 20 carbon atoms having a polyethylene crystalline structure, and to production of stereoregular polymers, particularly isotactic polymers of an α-olefin having 3 to 20 carbon atoms.

The polymerization catalyst of the present invention is also suitable as an isotactic stereoregular α-olefin polymerization catalyst, and particularly suitable as an isotactic stereoregular propylene polymerization catalyst. The method of producing a stereoregular α-olefin polymer of the present invention is suitable as a method of producing an isotactic stereoregular α-olefin polymer, and particularly suitable as a method of producing an isotactic stereoregular propylene polymer.

Specific examples of the isotactic stereoregular propylene polymer include a homopolymer of propylene; random copolymers of propylene with comonomers such as ethylene and/or α-olefin having 4 to 12 carbon atoms in an amount not deteriorating crystallinity; and block copolymers obtained by homo-polymerizing propylene or copolymerizing propylene with ethylene and/or an α-olefin having 4 to 12 carbon atoms (this is called "pre-stage polymerization"), then, polymerizing an α-olefin having 3 to 12 carbon atoms with ethylene (preferably, propylene with ethylene and/or an α-olefin having 4 to 12 carbon atoms) in one-stage or multi-stages (this is called "post-stage polymerization"). As the amount not deteriorating crystallinity in a random copolymer varies depending on the kind of a comonomer, the amount may be properly determined. In the case of, for example, ethylene the amount of repeating units derived from ethylene in the copolymer is usually 10 wt % or less, and in the case of α-olefins except propylene such as 1-butene or the like, the amount of repeating units derived from the α-olefin in the copolymer is usually 30 wt % or less, preferably 10 wt % or less. In the pre-stage polymerization for the block copolymer, the polymerization amount of, for example, ethylene is usually 10 wt % or less, preferably 3 wt % or less, further preferably 0.5 wt % or less, and the polymerization amount of an α-olefin is usually 15 wt % or less, preferably 10 wt % or less, and in the post-stage polymerization, the polymerization amount of ethylene is usually 20 to 80 wt %, preferably 30 to 50 wt %.

As the combination of propylene with other monomers constituting a copolymer, combinations of propylene with ethylene, propylene with butene-1, propylene with hexene-1, and the like are exemplified, but the present invention should not be limited thereto.

As the measure of isotactic stereoregularity, isotactic meso-triad fraction and isotactic meso-pentad fraction are used.

The isotactic meso-triad fraction herein referred to is a fraction of meso-triad units in isotactic sequences of units derived from propylene (hereinafter, referred to as "propylene unit") in a crystalline polypropylene molecule chain, in other word, a fraction of propylene units existing at the center of meso-triad units formed by meso-bonding of successive three propylene units, measured by a method published in A. Zambelli, et al., Macromolecules, 8, 687 (1975), namely, measured by using $^{13}$C-NMR. The isotactic meso-triad fraction is sometimes abbreviated as [mm]. The theoretical upper limit of [mm] is 1.00.

The process for producing an α-olefin polymer of the present invention is preferably applied to a process for producing an isotactic stereoregular α-olefin polymer having [mm] of more than 0.50, more preferably 0.70 or more, further preferably 0.80 or more.

The isotactic meso-pentad fraction is a fraction of meso-pentad units in isotactic sequences of propylene units in a crystalline polypropylene molecule chain, in other words, a fraction of propylene units existing at the center of successive five propylene units of meso-bonding in a crystalline polypropylene molecule chain, measured by a method published in A. Zambelli, et al., Macromolecules, 6, 925 (1973), namely, measured by using $^{13}$C-NMR. However, assignment of an NMR absorption peak is effected based on Macromolecules, 8, 687 (1975) introduced for the triad fraction. The isotactic meso-pentad fraction is sometimes abbreviated as [mmmm]. The theoretical upper limit of [mmmm] is 1.00.

The process for producing an α-olefin polymer of the present invention is preferably applied to a process for producing an isotactic stereoregular α-olefin polymer having [mmmm] of 0.25 or more, more preferably 0.50 or more, further preferably 0.75 or more.

The polymerization method also should not be particularly limited, and there can be applied, for example, solvent polymerization or slurry polymerization using, as a solvent, an aliphatic hydrocarbon (e.g. butane, pentane, hexane, heptane, octane), an aromatic hydrocarbon(e.g. benzene, toluene), or halogenated hydrocarbon(e.g. methylene dichloride), bulk polymerization in a liquefied monomer, gas-phase polymerization in a gaseous monomer, or the like, and any of continuous polymerization and batch-wise polymerization is possible.

The polymerization temperature can be usually from −50° C. to 200° C., and particularly preferably from −20° C. to 100° C., and the polymerization pressured is usually from normal pressure to 60 kg/cm²G. The polymerization time is appropriately determined generally depending on the kind of the intended polymer and the reaction apparatus, and can be from 1 minute to 20 hours. Further, for controlling the molecular weight of polymer to be obtained, a chain transfer agent such as hydrogen or the like can also be added.

EXAMPLES

The following Example and Comparative Example illustrate the present invention further in detail, but do not limit the scope of the invention.

Properties of polymers in Examples were measured by the following methods.
(1) Flow Rate (FR) was Determined by Measuring at 190° C. accoroding to ASTM D1238.
(2) Content of Repeating Unit Derived from α-olefin in copolymer It was determined from characteristic absorptions of ethylene and the α-olefin measured with an infrared spectrometer(IR-80 manufactured by Nippon Bunko, Co,. Ltd.), and was shown as the number of short chain branches per 1000 carbon(SCB).
(3) Melting Point (Unit: ° C.)

Using a differential scanning calorimeter (Seiko SSC-5200 manufactured by Seiko Instrument Inc.), the measurement was carried out under the following conditions:

Heating: 40 to 150° C. (10° C./min.), kept for 5 minutes,
Cooling: 150 to 10° C. (5° C./min.), kept for 10 minutes,
Measurement: 10 to 160° C. (5° C./min.)
(4) Molecular Weight and Molecular Weight Distribution (Mw/Mn)

It was measured by GPC (gel permeation chromatography) method under the following conditions.

Type: 150 CV type (Millipore Waters)
Column: TSK-GEL GMH-HT 7.5 mmφ×600 mm×2 columns
Measuring temperature: 140° C.
Solvent: orthodichlorobenzene
Sample concentration: 5 mg/5 mL
(5) Mass Spectrometry
Apparatus: Mass spectrometer JMS-700 manufactured by JEOL LTD.)
Data processor: MS-MP8220D
Acceleration voltage:8 kV
Opposite Electrode: 0 kV
Emitter: Carbon
Scanning speed: 10 seconds
(6) Stereoregularity The stereoregularity of a polymer was determined by measuring with $^{13}$C-NMR spectrometer AS250 manufactured by Bruker Limited, under the following conditions and calculating from an area ratio of peaks of methyl groups:

Solvent: o-dichlorobenzene/deuterated benzene=4/1(by volume)
Concentration: 10 mg/0.6 ml

Reference Example 1

Synthesis of chloro(3,5-diisopropyl-1-pyrazolyl) [hydrotris(3,5-diisopropyl-1-pyrazolyl)borate] manganese 35 ml of methylene dichloride solution containing 0.51 g of hydrotris(3,5-diisopropyl-1-pyrazolyl)borate ligand and 0.76 g of 3,5-diisopropyl-1-pyrazol was added into 10 ml of a methanol solution containing 0.21 g of manganese dichloride tetrahydrate, and the mixture was stirred at room temperature for 2 hours. After completion of the reaction, the solvents were distilled off under reduced pressure, and the residue was dissolved in 45 ml of methylene dichloride, and filtrated. Thus obtained powder was re-crystallized from acetonitrile, to obtain 0.38 g (yield: 70%) of the title compound of a white crystal.

(Elementary analysis) calculation value: C (61.06%), H, (8.61%), N(15.82%) measured value: C(60.88%), H, (8.99%), N(15.61%). The result of X-ray structural analysis of a single crystal is shown in FIG. 1.

(Mass Spectrometry) M⁺: 555

The following structural formula is the structural formula of the title compound, partially abbreviating a pyrazolyl ring.

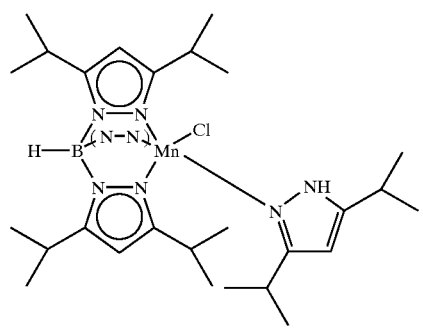

Reference Example 2

Synthesis of chloro[hydrotris(3-tert-butyl-5-isopropyl-1-pyrazolyl)borate]manganese 20 ml of methylene dichloride solution containing 1.07 g of hydrotris(3-tert-butyl-5-isopropyl-1-pyrazolyl) borate ligand was added into 15 ml of a methanol solution containing 0.47 g of manganese dichloride tetrahydrate, and the mixture was stirred at room temperature for 3 hours. After completion of the reaction, the solvents were distilled off under reduced pressure, and the residue was dissolved in 40 ml of methylene dichloride, and filtrated. The resulted solid was re-crystallized from an acetonitrile/methylene dichloride mixed solvent, to obtain 0.63 g (yield: 54%) of the title compound of a white crystal.

(Elementary analysis) calculation value: C(60.26%), H(8.77%), N(14.05%) measured value: C(59.68%), H(8.67%), N(13.94%).

Figure 2:
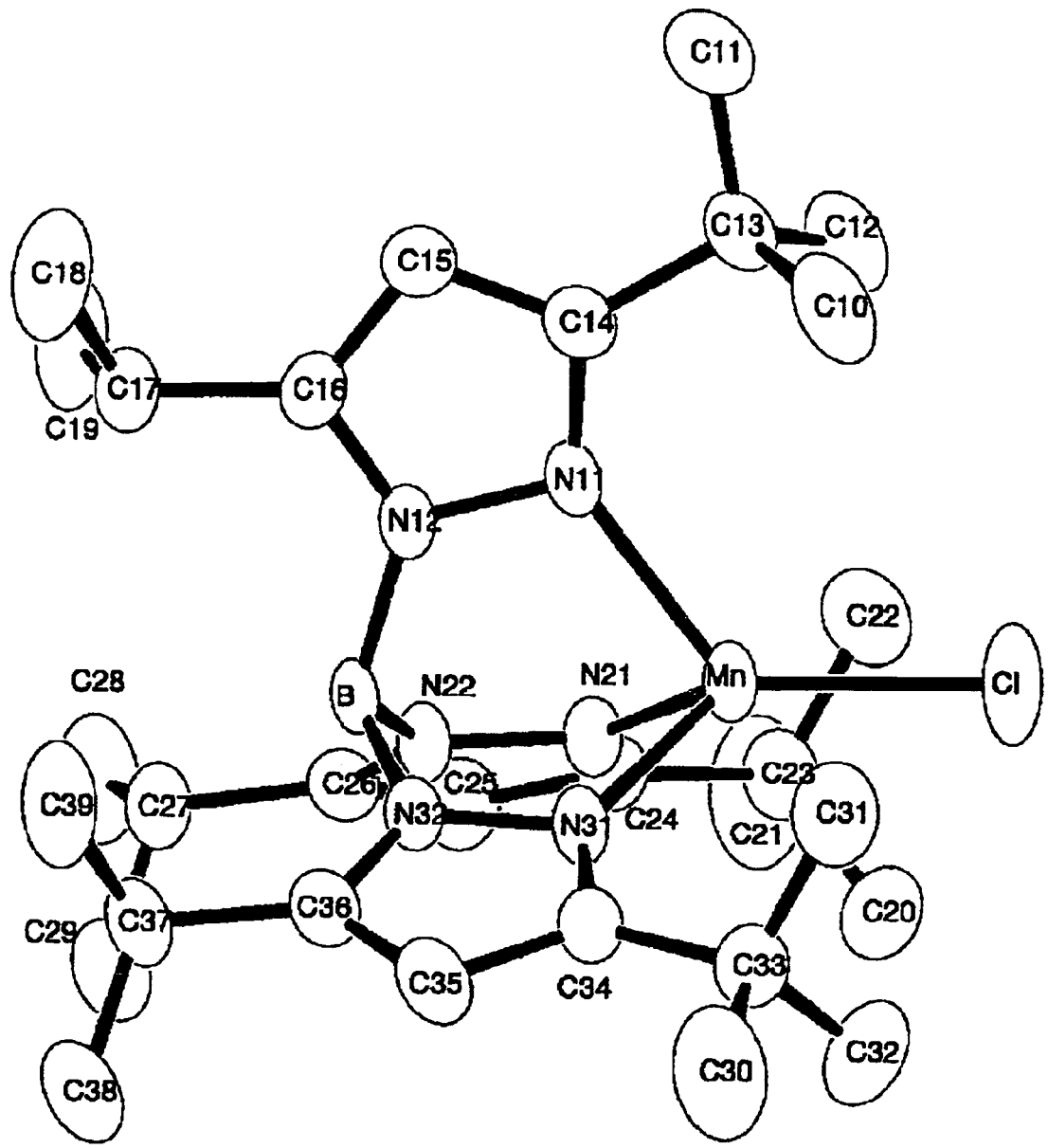
FIG. 2 shows a result of X-ray structure analysis of a single crystal of the compound obtained in Reference Example 2.

The result of X-ray structural analysis of a single crystal is shown in FIG. 2.

(Mass spectrometry) M⁺: 597

The following structural formula is the structural formula of the title compound, partially abbreviating a pyrazolyl ring.

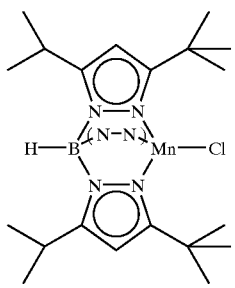

Reference Example 3

Synthesis of hydrotris(3-tert-butyl-5-isopropyl-1-pyrazolyl)borate]manganese nitrate 20 ml of methylene dichloride solution containing 1.07 g of hydrotris(3-tert-butyl-5-isopropyl-1-pyrazolyl) borate ligand was added into 10 ml of a methanol solution containing 0.47 g of manganese nitrate hexahydrate, and the mixture was stirred at room temperature for 2 hours. After completion of the reaction, the solvents were distilled off under reduced pressure, and the residue was dissolved in 45 ml of methylene dichloride, and filtrated. The resulted powder was re-crystallized from an acetonitrile/methylene dichloride mixed solvent, to obtain 0.31 g (yield: 15%) of the title compound of a light pink crystal.

IR(KBr, cm$^{-1}$), 2967(C—H), 2931(C—H), 2870(C—H), 2592(B—H), 1523(antisymmetrical NO$_3$), 1647, 1363, 1271 (symmetrical NO$_3$), 1170, 1061, 1049, 1019(NO), 796, 750, 644. (Mass spectrometry) M$^+$: 624

The following structural formula is the structural formula of the title compound, partially abbreviating a pyrazolyl ring.

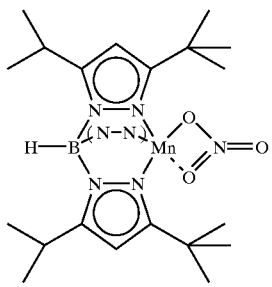

Reference Example 4

Synthesis of dichloro[tris(3,5-dimethyl-1-pyrazolyl)methane]manganese.0.5CH$_2$Cl$_2$ 10 ml of methylene dichloride solution containing 0.303 g of tris(3,5-dimethyl-1-pyrazolyl)methane ligand was added into 10 ml of a methanol solution containing 0.230 g of manganese dichloride tetrahydrate, and the mixture was stirred at room temperature for 3 hours. After completion of the reaction, the solvents were distilled off under reduced pressure, and the residue was dissolved in 45 ml of methylene dichloride, and filtrated. Thus obtained powder was re-crystallized from an acetonitrile/methylene dichloride mixed solvent, to obtain 0.127 g (yield: 27%) of the title compound of a white crystal.

(Elementary analysis) calculation value: C(41.71%), H(5.03%), N(18.24%), measured value: C(41.84%), H(5.16%), N(17.61%).

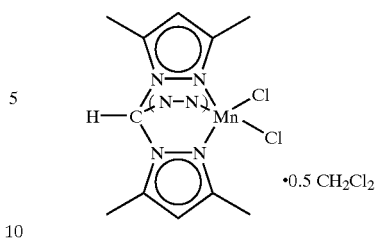

The following structural formula is the structural formula of the title compound, partially abbreviating a pyrazolyl ring.

Example 1

An autoclave having an inner volume of 0.4 L was dried under vacuum, and purged with argon, then, 200 ml of toluene was charged therein, and the autoclave was heated to 60° C. After the heating, ethylene was fed while the ethylene pressure is adjusted at 2.0 MPa, and after the system was stabilized, 1.0 mmol(mol number in terms of Al atom, hereinafter, the same meaning) of methyisobutylaluminoxane as a toluene solution (MMAO3A manufactured by Tohso-Akzo Ltd., hereinafter, referred to simply as "MMAO") was charged therein. Subsequently, 10.0 μmol of chloro(3,5-diisopropyl-1-pyrazolyl)[hydrotris(3,5-diisopropyl-1-pyrazolyl)borate]manganese synthesized in the above-mentioned Reference Example 1 was added. Then, polymerization was carried out for 60 minutes while controlling the temperature at 60° C.

As a result of polymerization, an ethylene polymer was produced at a rate of 1.0×10$^4$ g per hour per mol of a manganese atom.

Example 2

An autoclave having an inner volume of 0.4 L was dried under vacuum, and purged with argon, then, 200 ml of toluene was charged therein, and the autoclave was heated to 60° C. After the heating, ethylene was fed while the ethylene pressure is adjusted at 0.6 MPa, and after the system was stabilized, 1.0 mmol of triisobutylaluminum was charged therein. Subsequently, 20.0 μmol of chloro(3,5-diisopropyl-1-pyrazolyl)[hydrotris(3,5-diisopropyl-1-pyrazolyl)borate]manganese synthesized in the above-mentioned Reference Example 1 was added. Then, polymerization was carried out for 60 minutes while controlling the temperature at 60° C.

As a result of polymerization, an ethylene polymer having a melting point of 135.9° C. was produced at a rate of 2.2×10$^5$ g per hour per mol of a manganese atom.

Example 3

An autoclave having an inner volume of 0.4 L was dried under vacuum, and purged with argon, then, 200 ml of toluene was charged therein, and the autoclave was heated to 60° C. After the heating, ethylene was fed while the ethylene pressure is adjusted at 2.0 MPa, and after the system was stabilized, 1.0 mmol of triisobutylaluminum was charged therein. Subsequently, 10.0 μmol of chloro[hydrotris(3-tert-butyl-5-isopropyl-1-pyrazolyl)borate]manganese synthesized in the above-mentioned Reference Example 2 was added. Then, polymerization was carried out for 60 minutes while controlling the temperature at 60° C.

As a result of polymerization, an ethylene polymer having a melting point of 135.5° C. was produced at a rate of 9.2×10$^5$ g per hour per mol of a manganese atom.

Example 4

An autoclave having an inner volume of 0.4 L was dried under vacuum, and purged with argon, then, 10 g of 1-butene as an α-olefin and 180 ml of toluene as a solvent were charged therein, and the autoclave was heated to 60° C. After the heating, ethylene was fed while the ethylene pressure is adjusted at 2.0 MPa, and after the system was stabilized, 0.25 mmol of triisobutylaluminum was charged therein. Subsequently, 1.0 μmol of chloro[hydrotris(3-tert-butyl-5-isopropyl-1-pyrazolyl)borate]manganese, and subsequently 3.0 μmol of triphenylcarbeniumtetrakis (pentafluorophenyl) borate was added. Then, polymerization was carried out for 60 minutes while controlling the temperature at 60° C.

As a result of polymerization, an ethylene-1-hexene copolymer having a SCB of 3.6, FR of 6.1 g/10 min. and a melting point of 120.1° C. was produced at a rate of $1.6 \times 10^7$ g per hour per mol of a manganese atom.

Example 5

An autoclave having an inner volume of 0.4 L was dried under vacuum, and purged with argon, then, 30 ml of 1-hexene as an α-olefin and 170 ml of toluene as a solvent were charged therein, and the autoclave was heated to 60° C. After the heating, ethylene was fed while the ethylene pressure is adjusted at 1.0 MPa, and after the system was stabilized, 0.25 mmol of triisobutylaluminum was charged therein. Subsequently, 1.0 μmol of chloro[hydrotris(3-tert-butyl-5-isopropyl-1-pyrazolyl)borate]manganese, and subsequently 6.0 μmol of triphenylcarbeniumtetrakis (pentafluorophenyl) borate was added. Then, polymerization was carried out for 60 minutes while controlling the temperature at 60° C.

As a result of polymerization, an ethylene-1-hexene copolymer having a SCB of 23.7 and a melting point of 109.5° C. was produced at a rate of $2.0 \times 10^5$ g per hour per mol of a manganese atom.

Example 6

An autoclave having an inner volume of 0.4 L was dried under vacuum, and purged with argon, then, 200 ml of toluene was charged therein, and the autoclave was heated to 60° C. After the heating, ethylene was fed while the ethylene pressure is adjusted at 2.0 MPa, and after the system was stabilized, 1.0 mmol of triisobutylaluminum was charged therein. Subsequently, 20.0 μmol of hydrotris(3-tert-butyl-5-isopropyl-1-pyrazolyl)borate]manganese nitrate synthesized in the above-mentioned Reference Example 3 was added. Then, polymerization was carried out for 60 minutes while controlling the temperature at 60° C.

As a result of polymerization, an ethylene polymer having a melting point of 135.5° C. was produced at a rate of $7.0 \times 10^4$ g per hour per mol of a manganese atom.

Example 7

An autoclave having an inner volume of 0.4 L was dried under vacuum, and purged with argon, then, 10 g of 1-butene as an α-olefin and 180 ml of toluene as a solvent were charged therein, and the autoclave was heated to 60° C. After the heating, ethylene was fed while the ethylene pressure is adjusted at 2.0 MPa, and after the system was stabilized, 1.00 mmol of triisobutylaluminum was charged therein. Subsequently, 10.0 μmol of hydrotris(3-tert-butyl-5-isopropyl-1-pyrazolyl)borate]manganese nitrate, and subsequently 20.0 μmol of triphenylcarbeniumtetrakis (pentafluorophenyl)borate was added. Then, polymerization was carried out for 60 minutes while controlling the temperature at 60° C.

As a result of polymerization, an ethylene-1-hexene copolymer having a SCB of 11.1, FR of 3.0 g/10 min. and a melting point of 122.6° C. was produced at a rate of $6.4 \times 10^5$ g per hour per mol of a manganese atom.

Example 8

An autoclave having an inner volume of 0.4 L was dried under vacuum, and purged with argon, then, 30 ml of 1-hexene as an α-olefin and 170 ml of toluene as a solvent were charged therein, and the autoclave was heated to 60° C. After the heating, ethylene was fed while the ethylene pressure is adjusted at 1.0 MPa, and after the system was stabilized, 0.25 mmol of triisobutylaluminum was charged therein. Subsequently, 1.0 μmol of hydrotris(3-tert-butyl-5-isopropyl-1-pyrazolyl)borate]manganese nitrate, and subsequently 6.μmol of triphenylcarbeniumtetrakis (pentafluorophenyl) borate was added. Then, polymerization was carried out for 60 minutes while controlling the temperature at 60° C.

As a result of polymerization, an ethylene-1-hexene copolymer having a SCB of 13.4 and a melting point of 108.3° C. was produced at a rate of $4.0 \times 10^4$ g per hour per mol of a manganese atom.

Example 9

An autoclave having an inner volume of 0.4 L was dried under vacuum, and purged with argon, then, 200 ml of toluene was charged therein, and the autoclave was heated to 60° C. After the heating, ethylene was fed while the ethylene pressure is adjusted at 2.0 MPa, and after the system was stabilized, 1.0 mmol of triisobutylaluminum was charged therein. Subsequently, 10.0 μmol of dichloro[tris(3,5-dimethyl-1-pyrazolyl)methane]manganese synthesized in the above-mentioned Reference Example 4 was added. Further, 20.0 μmol of triphenylcarbeniumtetrakis (pentafluorophenyl) borate was added. Then, polymerization was carried out for 60 minutes while controlling the temperature at 60° C.

As a result of polymerization, an ethylene polymer having a melting point of 134.9° C. was produced at a rate of $3.7 \times 10^4$ g per hour per mol of a manganese atom.

Example 10

An autoclave having an inner volume of 0.4 L was dried under vacuum, and purged with argon, then, 10 g of 1-butene as an α-olefin and 180 ml of toluene as a solvent were charged therein, and the autoclave was heated to 60° C. After the heating, ethylene was fed while the ethylene pressure is adjusted at 2.0 MPa, and after the system was stabilized, 1.0 mmol of triisobutylaluminum was charged therein. Subsequently, 10.0 μmol of dichloro[tris(3,5-dimethyl-1-pyrazolyl)methane]manganese, and subsequently 30.0 μmol of triphenylcarbeniumtetrakis(pentafluorophenyl)borate was added. Then, polymerization was carried out for 60 minutes while controlling the temperature at 60° C.

As a result of polymerization, an ethylene-1-hexene copolymer having a SCB of 9.4, Mw of $5.4 \times 10^4$, Mw/Mn of 1.79, and a melting point of 121.8° C. was produced at a rate of $8.9 \times 10^4$ g per hour per mol of a manganese atom.

Example 11

An autoclave having an inner volume of 0.4 L was dried under vacuum, and purged with argon, then, 10 g of 1-butene as an α-olefin and 180 ml of toluene as a solvent were charged therein, and the autoclave was heated to 60° C. After the heating, ethylene was fed while the ethylene pressure is adjusted at 2.0 MPa, and after the system was stabilized, 1.0 mmol of triisobutylaluminum was charged therein. Subsequently, 20.0 μmol of dichloro[tris(3,5-dimethyl-1-pyrazolyl)methane]manganese, and subsequently 40.0 μ/mol of triphenylcarbeniumtetrakis(pentafluorophenyl) borate was added. Then, polymerization was carried out for 60 minutes while controlling the temperature at 60° C.

As a result of polymerization, an ethylene-1-utene copolymer having a SCB of 23.0, Mw of $5.5 \times 10^4$, Mw/Mn of 1.88, and a melting point of 99.9° C. was produced at a rate of $1.6 \times 10^4$ g per hour per mol of a manganese atom.

Example 12

An autoclave having a content volume of 0.1 L sufficiently heated and dried was dried under vacuum, purged with nitrogen, then, 1.25 ml (1.25 mmol) of a 1 mol/L toluene solution of triisobutylaluminum was poured into this, further, 10.0 μmol of chloro[hydrotris(3-tert-butyl-5-isopropyl-1-pyrazolyl)borate]manganese synthesized in the above-mentioned Reference Example 2 was added, and 20 μmol of triphenylcarbenium[tetrakis(pentafluorophenyl) borate] was added. Subsequently, 40 g of propylene was charged, then, polymerization was conducted for 60 minutes while controlling the temperature at 60° C.

As a result of polymerization, an isotactic stereoregular propylene polymer having a meso-triad fraction [mm] of 0.905 and a pentad fraction [mmmm] of 0.819 was produced at a rate of $4.0 \times 10^4$ g per hour per mol of a manganese atom.

According to the present invention as described in detail above, a catalyst for addition polymerization using a transition metal compound of Group 7, and a process for producing addition polymers such as olefin polymers with the catalyst, are provided.

What is claimed is:
1. A process for producing an ethylene-α-olefin having 3 to 20 carbon atoms which comprises copolymerizing ethylene and an α-olefin having 3 to 20 carbon atoms with a catalyst for addition polymerization obtained by a process comprising contacting a transition metal compound (A) of the following general formula [1] or [2] with an aluminum compound (B) described below and/or a boron compound (C) described below: (A):

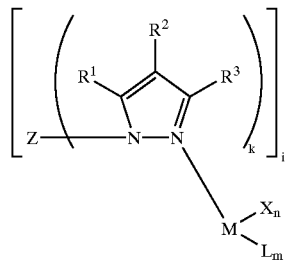

[1]

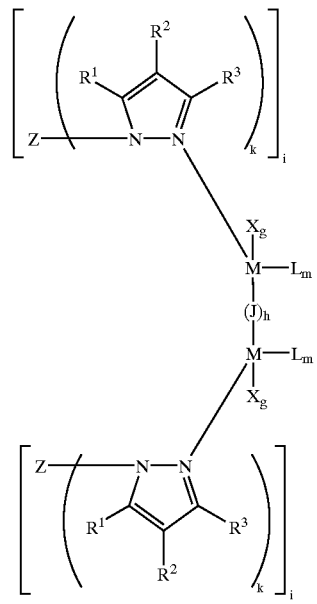

[2]

wherein, M represents a transition metal atom of Group 7 of the Periodic Table of the Elements; X's represent each independently a hydrogen atom, halogen atom, alkyl group, aralkyl group, substituted silyl group, alkoxy group, aralkyloxy group, aryloxy group, acyloxy group, acyl group, di-substituted amino group, substituted pyrazolyl group, isocyanate group, thiocyanate group, nitrosyl group, azide group, cyano group, hydroxyl group, perhalide ion, nitrate ion, hexa-halogenated phosphorus ion or tetra-substituted boron ion; L represents a neutral ligand connected with M via a lone pair or π electron; n represents an integer of 0 to 7 so selected that the compound is neutral; g represents an integer of 0 to 6 so selected that the compound is neutral; i represents 1; m represents an integer of 0 to 5; $R^1$ to $R^3$ represent each independently a hydrogen atom, halogen atom, alkyl group, aralkyl group, aryl group or substituted silyl group and all of $R^1$ to $R^3$ may be the same or different; Z represents a group of $R^4_{z+1}\text{-}Z^1\text{-}, R^4_z\text{-}Z^2\text{-}$ or

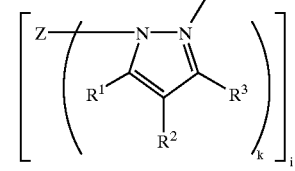

wherein, $Z^1$ represents an atom of Groups 13 to 15 of the Periodic Table of the Elements; $Z^2$ represents an atom of Group 13 to 15 of the Periodic Table of the Elements and $Z^3$ represents an atom of Group 15 of the Periodic Table of the Elements; $R^4$ in each case represents a hydrogen atom, halogen atom, alkyl group, aralkyl group, substituted silyl group, alkoxy group, aralkyloxy group, aryloxy group, di-substituted amino group or substituted pyrazolyl group; k represents an integer of 1 to 3 an the sum of k and z is 3; J in the general formula [2] is a bridging group connecting two M's; and h represents an integer of 1 to 3 showing the number of bridging connecting two M's;
  (B): one or more aluminum compounds selected from the following (B1) to (B3),
    (B1): organoaluminum compounds of the general formula $E^1_a AlZ^4_{3-a}$,
    (B2): cyclic aluminoxanes having a structure of the general formula $\{-Al(E^2)-O-\}_b$, (B3): linear aluminoxanes having a structure of the general formula $E^3\{-Al(E^3)-O-\}_c AlE^3_2$, wherein, each of $E^1$, $E^2$ and $E^3$ represents a hydrocarbon group, and all of $E^1$s, all of $E^2$s and all of $E^3$ s may be the same or different; $Z^4$ represents a hydrogen atom or halogen atom, all of $Z^4$s may be the same or different; "a" represents a number satisfying $0<a\leq 3$, "b" represents an integer of 2 or more; and/or c represents an integer of 1 or more; and (C): one or more boron compounds selected from the following (C1) to (C3),
(C1): boron compounds of the general formula $BQ^1Q^2Q^3$,
(C2): boron compounds of the general formula $G^+(BQ^1Q^2Q^3Q^4)^-$,
(C3): boron compounds of the general formula $(L-H)^+(BQ^1Q^2Q^3Q^4)^-$, wherein, B represents a boron atom of tri-valent stat ; $Q^1$ to $Q^4$ represent a halogen atom, hydrocarbon group, halogenated hydrocarbon group, substituted silyl group, alkoxy group or di-substituted amino group, and they may be the same or different; $G^+$ represents an inorganic or organic cation; L represents a neutral Lewis base; and $(L-H)^+$ represents a Brønsted acid.

2. The process according to claim 1, wherein M is a member selected from the group consisting of a manganese atom, technetium atom and rhenium atom.

3. The process according to claim 2, wherein M is a manganese atom.

4. The catalyst for addition polymerization according to claim 1, wherein Z is a group represented by

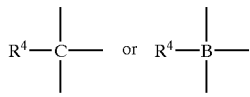

wherein, $R^4$ in these cases represents a hydrogen atom, alkyl group, aralkyl group or substituted pyrazolyl group.

5. The catalyst for addition polymerization according to claim 2, wherein Z is a group represented by

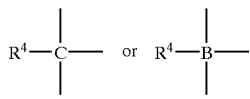

wherein, $R^4$ in these cases represents a hydrogen atom, alkyl group, aralkyl group or substituted pyrazolyl group.

6. The catalyst for addition polymerization according to claim 3, wherein Z is a group represented by represented by

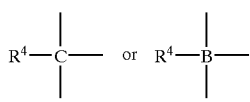

wherein, $R^4$ in these cases represents a hydrogen atom, alkyl group, aralkyl group or substituted pyrazolyl group.

7. A process for producing a stereoregular α-olefin polymer having an isotactic meso-triad fraction of more than 0.50, which comprises polymerizing an α-olefin having 3 to 20 carbon atoms with a catalyst for addition polymerization obtained by a process comprising contacting a transition metal compound (A) of the following general formula [1] or [2] with an aluminum compound (B) described below and/or a boron compound (C) described below: (A):

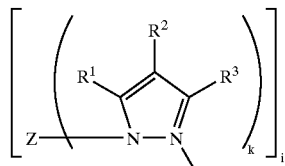

[1]

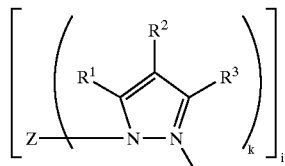

[2]

wherein, M represents a transition metal atom of Group 7 of the Periodic Table of the Elements; X's represent each independently a hydrogen atom, halogen atom, alkyl group, aralkyl group, substituted silyl group, alkoxy group, aralkyloxy group, aryloxy group, acyloxy group, acyl group, di-substituted amino group, substituted pyrazolyl group, isocyanate group, thiocyanate group, nitrosyl group, azide group, cyano group, hydroxyl group, perhalide ion, nitrate ion, hexa-halogenated phosphorus ion or tetra-substituted boron ion; L represents a neutral ligand connected with M via a lone pair or π electron; n represents an integer of 0 to 7 so selected that the compound is neutral; g represents an integer of 0 to 6 so selected that the compound is neutral; i represents 1; m represents an integer of 0 to 5; $R^1$ to $R^3$ represent each independently a hydrogen atom, halogen atom, alkyl group, aralkyl group, aryl group or substituted silyl group and all of $R^1$ to $R^3$ may be the same or different; Z represents a group of $R^4_{z+1}-Z^1-$, $R^4_z-Z^2-$ or

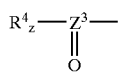

wherein, $Z^1$ represents an atom of Groups 13 to 15 of the Periodic Table of the Elements; $Z^2$ represents an atom of Group 13 to 15 of the Periodic Table of the Elements and $Z^3$ represents an atom of Group 15 of the Periodic Table of the Elements; $R^4$ in each case represents a hydrogen atom, halogen atom, alkyl group, aralkyl group, substituted silyl group, alkoxy group, aralkyloxy group, aryloxy group, di-substituted amino group or substituted pyrazolyl group; k represents an integer of 1 to 3 an the sum of k and z is 3; J in the general formula [2] is a bridging group connecting two M's; and h represents an integer of 1 to 3 showing the number of bridging connecting two M's;

(B): one or more aluminum compounds selected from the following (B1) to (B3), (B1): organoaluminum compounds of the general formula $E^1_a AlZ^4_{3-a}$, (B2): cyclic aluminoxanes having a structure of the general formula $\{-Al(E^2)-O-\}_b$, (B3): linear aluminoxanes having a structure of the general formula $E^3\{-Al(E^3)-O-\}_c AlE^3_2$, wherein, each of $E^1$, $E^2$ and $E^3$ represents a hydrocarbon group, and all of $E^1$s, all of $E^2$s and all of $E^3$s may be the same or different; $Z^4$ represents a hydrogen atom or halogen atom, all of $Z^4$s may be the same or different; "a" represents a number satisfying $0 < a \leq 3$, "b" represents an integer of 2 or more; and/or "c" represents an integer of 1 or more; and (C): one or more boron compounds selected from the following (C1) to (C3), (C1): boron compounds of the general formula $BQ^1Q^2Q^3$, (C2): boron compounds of the general formula $G^+BQ^1Q^2Q^3Q^4)^-$, (C3): boron compounds of the general formula $(L-H)^+(BQ^1Q^2Q^3Q^4)^-$, wherein, B represents a boron atom of tri-valent stat ; $Q^1$ to $Q^4$ represent a halogen atom, hydrocarbon group, halogenated hydrocarbon group, substituted silyl group, alkoxy group or di-substituted amino group, and they may be the same or different; $G^+$ represents an inorganic or organic cation; L represents a neutral Lewis base; and $(L-H)^+$ represents a Brønsted acid.

8. The process according to claim 7, wherein M is a member selected from the group consisting of a manganese atom, technetium atom and rhenium atom.

9. The process according to claim 8, wherein M is a manganese atom.

10. The catalyst for addition polymerization according to claim 7, wherein Z is a group represented by

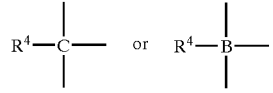

wherein, $R^4$ in these cases represents a hydrogen atom, alkyl group, aralkyl group or substituted pyrazolyl group.

11. The catalyst for addition polymerization according to claim 9, wherein Z is a group represented by

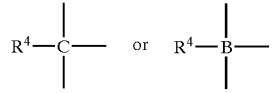

wherein, $R^4$ in these cases represents a hydrogen atom, alkyl group, aralkyl group or substituted pyrazolyl group.

12. The process according to claim 7, wherein the α-olefin having 3 to 20 carbon atoms is propylene.

* * * * *